United States Patent
Takata et al.

(10) Patent No.: US 11,869,684 B2
(45) Date of Patent: Jan. 9, 2024

(54) WIRE HARNESS AND WIRE HARNESS MANUFACTURING METHOD

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Yutaka Takata, Yokkaichi (JP); Shintaro Nambara, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/992,722

(22) Filed: Aug. 13, 2020

(65) Prior Publication Data
US 2021/0057128 A1      Feb. 25, 2021

(30) Foreign Application Priority Data
Aug. 21, 2019   (JP) ................. 2019-151493

(51) Int. Cl.
*H01B 7/282*      (2006.01)
*H01B 7/00*       (2006.01)
(Continued)

(52) U.S. Cl.
CPC ......... *H01B 7/2825* (2013.01); *H01B 7/0045* (2013.01); *H01B 7/285* (2013.01); *H01B 13/01209* (2013.01); *B60R 16/0207* (2013.01)

(58) Field of Classification Search
CPC ...... H02G 15/18; H02G 15/003; H01B 7/285; B60R 16/0207
See application file for complete search history.

(56) References Cited

U.S. PATENT DOCUMENTS 3,138,657 A * 6/1964 Wengen ................. H02G 15/18
                                                 174/76
3,852,516 A * 12/1974 Vander Ploog ...... H02G 15/003
                                                 174/71 R
(Continued)

FOREIGN PATENT DOCUMENTS

JP   H07263106 A * 10/1995  ............... H01R 4/70
JP   2015-159070 A    9/2015
(Continued)

*Primary Examiner* — Paresh Paghadal
(74) *Attorney, Agent, or Firm* — Oliff PLC

(57) ABSTRACT

A wire harness including: a wire bundle that includes a plurality of wires, each wire of the plurality of wires includes a conductor and an insulating covering that covers an outer circumference of the conductor, and each wire of the plurality of wires includes an exposed portion at which the conductor is exposed from the insulating covering; a splice body; and a waterproofing cover, wherein: at the splice body, the exposed portions of the wires forming the wire bundle are bonded to each other, a portion of the wire bundle that is adjacent to the splice body and at which the conductors are covered by the insulating coverings is a covered region, the waterproofing cover integrally covers the splice body and the covered region with a resin material.

10 Claims, 9 Drawing Sheets

(51) Int. Cl.
  *H01B 7/285* (2006.01)
  *H01B 13/012* (2006.01)
  *B60R 16/02* (2006.01)

(56) References Cited

U.S. PATENT DOCUMENTS

| | | | | |
|---|---|---|---|---|
| 4,822,434 A * | 4/1989 | Sawaki | ............... | B29C 35/0888 |
| | | | | 156/275.5 |
| 4,863,535 A * | 9/1989 | More | ....................... | H01R 4/70 |
| | | | | 156/49 |
| 4,963,700 A * | 10/1990 | Olsen | ..................... | H02G 15/18 |
| | | | | 174/138 F |
| 2015/0340848 A1* | 11/2015 | Nakashima | ............ | H02G 15/18 |
| | | | | 427/508 |
| 2017/0338005 A1* | 11/2017 | Ito | ............................ | H02G 1/14 |
| 2019/0096543 A1* | 3/2019 | Itou | ........................ | H02G 15/18 |
| 2019/0131033 A1* | 5/2019 | Itou | ..................... | H01B 7/2825 |

FOREIGN PATENT DOCUMENTS

| | | |
|---|---|---|
| JP | 2018-032589 A | 3/2018 |
| JP | 2018-073774 A | 5/2018 |

\* cited by examiner

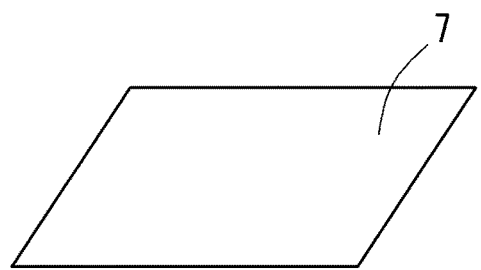
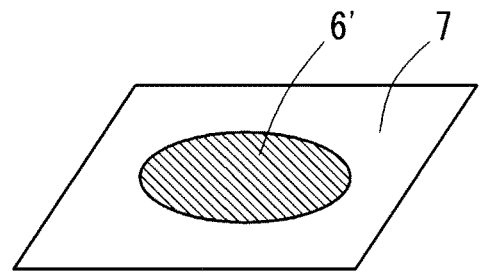
FIG. 4A    FIG. 4B
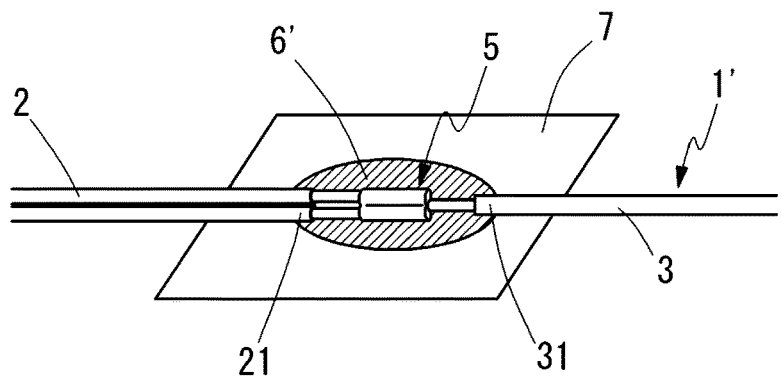
FIG. 4C
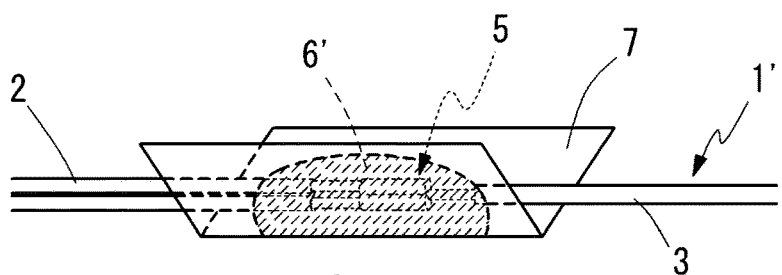
FIG. 4D
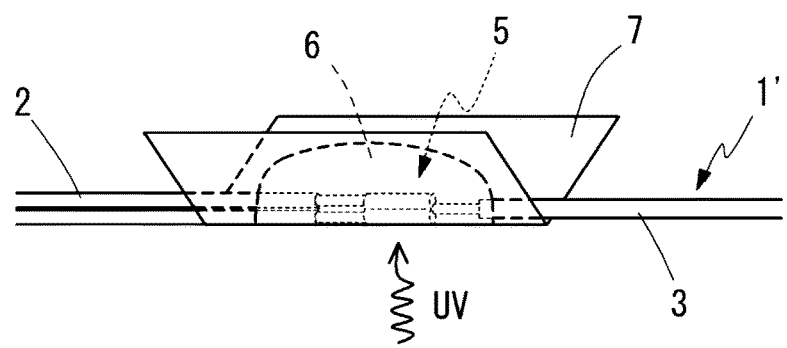
FIG. 4E

WIRE HARNESS AND WIRE HARNESS MANUFACTURING METHOD

BACKGROUND

The present disclosure relates to a wire harness and a wire harness manufacturing method.

In a wire harness including multiple wires, a splice portion is formed by bonding conductors that are exposed from insulating coverings of the wires to each other using a crimped terminal or the like in some cases. A wire harness including this kind of splice portion is disclosed in, for example, JP 2015-159070A, JP 2018-73774A, JP 2018-32589A, and the like. In some cases, the portion including the splice portion is covered with a material through which water is not likely to pass, such as a resin material, for the purpose of protecting the splice portion from contact with water. In particular, if the wire harness is to be used in an environment in which contact with water is likely to occur, such as an automobile interior, it is important to waterproof the splice portion. For example, JP 2015-159070A and JP 2018-73774A disclose modes in which a waterproofing member that covers the splice portion is provided in this manner. In JP 2015-159070A and JP 2018-73774A, constituent materials of the waterproofing member are studied such that a high waterproofing performance is obtained.

JP 2015-159070A, JP 2018-73774A, and JP 2018-32589A are examples of related art.

If a splice portion of a wire harness is to be provided with a waterproofing member, it is effective to devise the material constituting the waterproofing member as in JP 2015-159070A and JP 2018-73774A, from the viewpoint of improving the waterproofing property. However, in this type of waterproofing member, the structure of the waterproofing member, such as the specific position at which the material constituting the waterproofing member is to be arranged, and the relationship between the waterproofing member and other constituent members of the wire harness are also expected to influence the waterproofing performance. By studying the structure of the waterproofing member covering the splice portion, there is a possibility that the waterproofing performance can be further improved.

An exemplary aspect of the disclosure provides a wire harness that can provide a high waterproofing property to a splice portion at which conductors of multiple wires are bonded, and a method according to which such a wire harness can be manufactured.

SUMMARY

A wire harness according to the present disclosure includes: a wire bundle that includes a plurality of wires, each wire of the plurality of wires includes a conductor and an insulating covering that covers an outer circumference of the conductor, and each wire of the plurality of wires includes an exposed portion at which the conductor is exposed from the insulating covering; a splice body; and a waterproofing cover, wherein: at the splice body, the exposed portions of the wires forming the wire bundle are bonded to each other, a portion of the wire bundle that is adjacent to the splice body and at which the conductors are covered by the insulating coverings is a covered region, the waterproofing cover integrally covers the splice body and the covered region with a resin material, and the waterproofing cover includes an inter-wire filling that covers an entire circumference of at least one of the wires forming the wire bundle, and is obtained by filling a region between the wires with the resin material.

A wire harness manufacturing method of the present disclosure is for manufacturing the above-described wire harness by executing, in the stated order: a bonding step of bundling the plurality of wires to form the wire bundle, bonding the exposed portions to form the splice body, and thereby producing a harness precursor; an isolation step of providing distance between the plurality of wires forming the wire bundle in the harness precursor; and a waterproofing step of forming the waterproofing cover by integrally covering the splice body and the covered region with the resin material.

The wire harness according to the present disclosure can provide a high waterproofing property to a splice body at which conductors of multiple wires are bonded. Also, according to the wire harness manufacturing method of the present disclosure, it is possible to manufacture such a wire harness.

BRIEF DESCRIPTION OF THE DRAWINGS

FIGS. 2A and 2B show two different modes.

FIGS. 4A to 4E are diagrams illustrating a waterproofing step for manufacturing the waterproofing portion. FIG. 4A shows a sheet preparation step, FIG. 4B shows a resin arrangement step, FIG. 4C shows a harness arrangement step, FIG. 4D shows an envelopment step, and FIG. 4E shows a solidification step. In the drawings, an unsolidified resin composition is denoted by diagonal lines.

FIGS. 5A and 5B are respectively a plan view and a perspective view of a Y-shaped jig. FIGS. 5C and 5D are respectively plan views of an I-shaped jig and an E-shaped jig.

FIG. 6A shows a case of using a Y-shaped jig, FIG. 6B shows a case of using an I-shaped jig, and FIG. 6C shows a case of using an E-shaped jig. The internal structures of the wires are omitted.

FIG. 7A shows a sheet preparation step, FIG. 7B shows a first resin arrangement step, FIG. 7C shows a first solidification step, FIG. 7D shows a second resin arrangement step, FIG. 7E shows a harness arrangement step, FIG. 7F shows an envelopment step, and FIG. 7G shows a second solidification step. In the drawings, an unsolidified resin composition is denoted by diagonal lines.

FIG. 8A shows a sheet preparation step, FIG. 8B shows a spacer arrangement step, FIG. 8C shows a resin arrangement step, FIG. 8D shows a harness arrangement step, FIG. 8E shows an envelopment step, and FIG. 8F shows a solidification step. In the drawings, an unsolidified resin composition is denoted by diagonal lines.

DETAILED DESCRIPTION OF EMBODIMENTS

Figure 1:
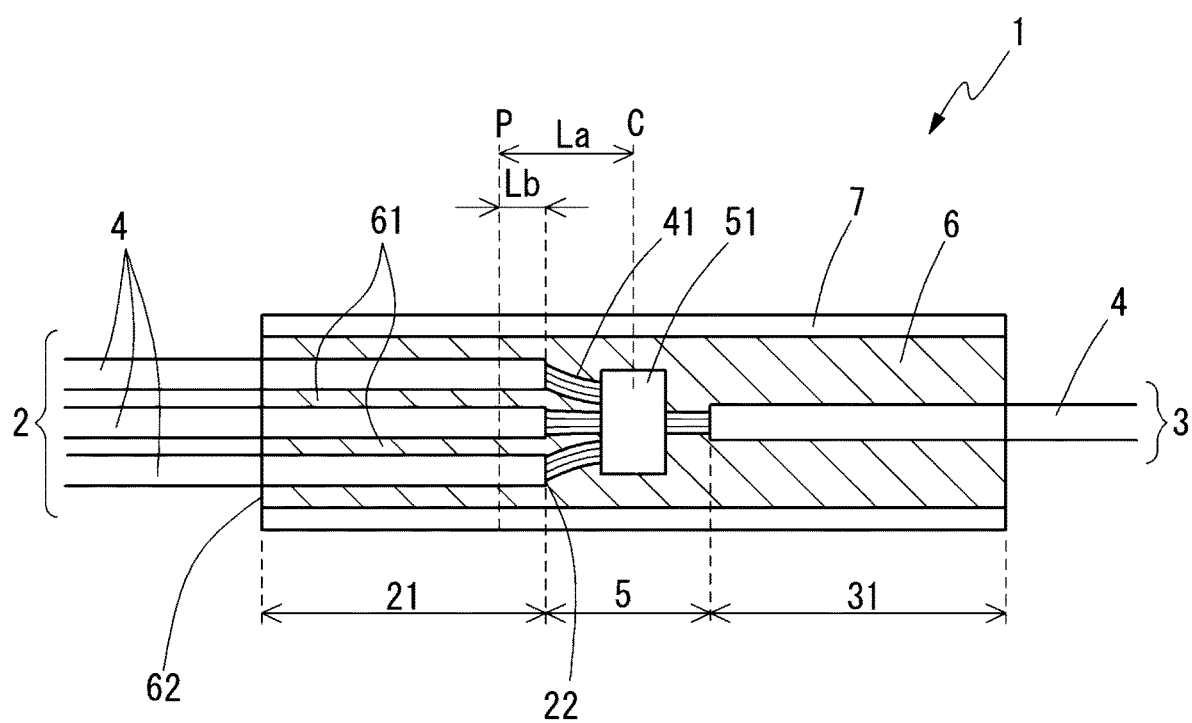
FIG. 1 is a side view showing a wire harness according to an embodiment of the present disclosure. In this drawing, a resin material filling a region enveloped by a sheet member is indicated by diagonal lines.

Description of the Embodiments of the Disclosure

First, embodiments of the present disclosure will be listed and described.

A wire harness according to the present disclosure includes: a wire bundle; a splice portion; and a waterproofing portion. The wire bundle includes a plurality of wires. The wires each include a conductor and an insulating covering that covers an outer circumference of the conductor, and each include an exposed portion at which the conductor is exposed from the insulating covering. At the splice portion, the exposed portions of the wires constituting the wire bundle are bonded to each other. A portion of the wire bundle that is adjacent to the splice portion and at which the conductors are covered by the insulating coverings is a covered region. The waterproofing portion integrally covers the splice portion and the covered region with a resin material. The waterproofing portion includes an inter-wire filling portion that covers the entire circumference of at least one of the wires constituting the wire bundle, and is obtained by filling a region between the wires with the resin material.

In the above-described wire harness, the waterproofing portion integrally covers the splice portion and the covered region, which is a region in which the conductors constituting the wires are covered by the insulating coverings. The waterproofing portion covers the entire circumference of at least one of the multiple wires constituting the wire bundle and includes the inter-wire filling portion obtained by the resin material filling the region between the wires in the covered region. For this reason, the area of contact between the waterproofing portion and the insulating coverings is greater and adhesion of the waterproofing portion to the wires is improved compared to the case where all of the wires are in contact with each other and the resin material does not fill the space between the wires. As a result, it is possible to effectively suppress a case in which liquid such as water enters through the boundary portion between the waterproofing portion and the wires.

In particular, when the wire harness undergoes a change in temperature, the insulating coverings included in the wires and the resin material included in the waterproofing portion have different behaviors of expanding and contracting in response to the change in temperature, whereby stress is likely to occur between the insulating covering and the resin material. However, in the above-described wire harness, the inter-wire filling portion filled with the resin material is provided between the wires constituting the wire bundle, and thus the amount of resin material surrounding the wires is greater compared to the case where no such inter-wire filling portion is formed. Due to there being a large amount of the resin material, the stress that occurs due to the change in temperature can be effectively mitigated. Accordingly, even if the wire harness undergoes a change in temperature, the resin material is not likely to separate due to the occurrence of stress. Thus, due to the existence of the inter-wire filling portion, the waterproofing portion can provide a high waterproofing property to the splice portion, and the high waterproofing property can be further maintained even in an environment that undergoes a temperature change.

Here, it is preferable that in the inter-wire filling portion, the resin material covers the entire circumference of each of the wires constituting the wire bundle. In this case, the resin material fills the space between the wires included in the wire bundle, and therefore the adhesion of the waterproofing portion to the wires is particularly likely to increase. Also, since the total amount of the resin material that fills the region between the wires is greater, the effect of mitigating stress between the resin material and the insulating coverings when undergoing a temperature change is particularly excellent. Due to these effects, the waterproofing portion exhibits and maintains a particularly high waterproofing property.

It is preferable that the waterproofing portion covers the covered region at at least a reference position located 10 mm away from the position of the center of the splice portion, at the reference position, a gap having a distance that is 3% or more of the thickness of the insulating covering is present between at least two wires selected from the wires constituting the wire bundle, and the inter-wire filling portion is formed by filling the gap. In this case, an amount of the resin material that is sufficient with respect to the thickness of the insulating covering fills the regions between the wires in the covered region, and thereby stress mitigation during a change in temperature is effectively achieved. As a result, a particularly excellent waterproofing property is likely to be obtained in the waterproofing portion.

It is preferable that at the reference position, gaps are included between all of the wires constituting the wire bundle and adjacent wires, and the maximum value of the distances of the gaps is at least 3% of the thickness of the insulating covering, and the inter-wire filling portion is formed by filling the gaps. In this case, a particularly high effect of stress mitigation is obtained between the wires and the resin material by ensuring a large amount of the resin material arranged in the region between the wires. As a result, the waterproofing property is even more likely to be improved in the waterproofing portion.

It is preferable that the wire bundle is divided into a first wire bundle including a plurality of the wires and a second wire bundle including one or more of the wires, the first wire bundle and the second wire bundle extend in different directions on both sides of the splice portion, the waterproofing portion integrally covers the splice portion, the covered region of the first wire bundle, and the covered region of the second wire bundle with the resin material, and the waterproofing portion includes the inter-wire filling portion in at least a region between the wires constituting the first wire bundle. In this case, the splice portion is a so-called intermediate splice portion at which exposed portions provided between two wire bundles extending in different directions are bonded. By integrally covering the intermediate splice portion and the covered regions on both sides, it is possible to provide the intermediate splice portion with a high waterproofing property. In particular, by forming the inter-wire filling portion in at least the region between the wires constituting the first wire bundle and filling the inter-wire filling portion with the resin material, the waterproofing property is improved, and furthermore, the high waterproofing property is likely to be maintained even in an environment that undergoes a change in temperature. If the second wire bundle also includes multiple wires, the waterproofing property can be even further improved if an inter-wire filling portion is formed in the second wire bundle as well.

It is preferable that the wire harness further includes a sheet member enveloping the outer circumference of the waterproofing portion, and the waterproofing portion is formed covering the entire circumferences of the splice portion and the covered region between the sheet member and the splice portion and between the sheet member and the covered region. In this case, the waterproofing portion including the inter-wire filling portion can be easily formed using the sheet member. Since the waterproofing portion filled with the resin material is formed over the entire outer circumferences of the splice portion and the covered regions between the splice portion and the sheet member, a high waterproofing property resulting from the waterproofing portion is likely to be ensured in the splice portion, a protective property obtained by the waterproofing portion is improved, and damage and insulation defects are not likely to occur even if contact with an external portion or the like occurs.

A wire harness manufacturing method of the present disclosure is for manufacturing the above-described wire harness by executing, in the stated order: a bonding step of bundling the plurality of wires to form the wire bundle, bonding the exposed portions to form the splice portion, and thereby producing a harness precursor; an isolation step of providing distance between the plurality of wires constituting the wire bundle in the harness precursor; and a waterproofing step of forming the waterproofing portion by integrally covering the splice portion and the covered region with the resin material.

In the above-described method for manufacturing a wire harness, the waterproofing portion is formed in a waterproofing step in a state in which a distance has been provided between the multiple wires constituting the wire bundle in an isolation step. For this reason, in the waterproofing step, the resin material is introduced into the region between the wires and the inter-wire filling portion is easily formed. The splice portion can be provided with a high waterproofing property by forming the waterproofing portion including the inter-wire filling portion. Also, a wire harness is achieved which can maintain the high waterproofing property even in an environment that undergoes a change in temperature.

Here, it is preferable that in the isolation step, distance is provided between the plurality of wires constituting the wire bundle by arranging a jig that is to be interposed between the plurality of wires constituting the wire bundle, at a position located away from the splice portion with respect to the position at which the waterproofing portion is to be formed. By using the jig, it is possible to reliably form the inter-wire filling portion by providing distance between the multiple wires constituting the wire bundle and filling the region between the wires with the resin material.

It is preferable that in the waterproofing step, the above-described wire harness including the sheet member, which includes a first solidified portion and a second solidified portion as the waterproofing portion, is manufactured by executing, in the stated order: a first resin arrangement step of arranging a resin composition that is to be solidified to be the resin material, on an outer surface of the sheet member spread out into a flat shape, a first solidification step of forming the first solidified portion by solidifying the resin composition arranged in the first resin arrangement step, a second resin arrangement step of arranging the resin composition on a region including the outer surface of the first solidified portion, a harness arrangement step of arranging the harness precursor such that the splice portion and the covered region are arranged on the first solidified portion via the resin composition arranged in the second resin arrangement step, an envelopment step of enveloping the splice portion and the covered region using the surface of the sheet member on which the resin composition is arranged, and a second solidification step of solidifying the resin composition enveloped by the sheet member to form the second solidification portion. In this case, by implementing the first resin arrangement step and the first solidification step when forming the waterproofing portion, a layer of the resin material is reliably interposed between the surface of the sheet member and the splice portion and covered region of the harness precursor. Accordingly, the waterproofing portion filled with the resin material is easily formed between the sheet member and the splice portion and covered region over the entire outer circumferences of the splice portion and the covered region in the wire harness to be manufactured, and it is possible to suitably manufacture a wire harness having a higher waterproofing property and protective property with respect to the splice portion.

Alternatively, it is preferable that in the waterproofing step, the above-described wire harness including the sheet member is manufactured by executing, in the stated order: a spacer arrangement step of arranging a flexible pair of spacers with an interval therebetween on an outer surface of the sheet member spread out into a flat shape, a resin arrangement step of arranging a resin composition that is to be solidified to be the resin material in a region between the pair of spacers, a harness arrangement step of placing the harness precursor on the pair of spacers such that the splice portion and the covered region are arranged between the pair of spacers, an envelopment step of enveloping the splice portion and the covered region using the surface of the sheet member on which the pair of spacers and the resin composition are arranged, and a solidification step of solidifying the resin composition enveloped by the sheet member to form the waterproofing portion. In this case, when forming the waterproofing portion, the spacer arrangement step in which the pair of spacers are arranged on the outer surface of the sheet member is carried out, and then in the resin arrangement step, the resin composition is arranged between the spacers, and in the harness arrangement step, the splice portion and the covered region are arranged between the spacers. For this reason, a layer of the resin composition is reliably interposed between the surface of the sheet member and the splice portion and covered region of the harness precursor. In this state, by carrying out the envelopment step and the solidification step, the waterproofing portion filled with the resin material is easily formed between the sheet member and the splice portion and covered region over the entire outer circumferences of the splice portion and the covered region, and it is possible to suitably manufacture a wire harness having a higher waterproofing property and protective property with respect to the splice portion.

DESCRIPTION OF DETAILS OF EMBODIMENTS OF THE PRESENT DISCLOSURE

Hereinafter, a wire harness and a wire harness manufacturing method according to an embodiment of the present disclosure will be described with reference to the drawings. The wire harness according to the embodiment of the present disclosure includes a splice portion at which multiple wires are bonded, and a waterproofing portion that covers a region including the splice portion. According to the wire harness manufacturing method according to the embodiment of the present disclosure, it is possible to manufacture such a wire harness. Note that in the present specification, concepts indicating shapes and positions of members, such as parallel, vertical, opposite directions, and a linear shape, are not limited to geometrically exact concepts, but include divergence of a degree that is allowed in a wire harness and constituent members.

[1] Wire Harness
Overview of Structure

First, an overview of a structure of a wire harness according to an embodiment of the present disclosure will be described. FIG. 1 shows an overview of a wire harness 1 according to an embodiment of the present disclosure.

The wire harness 1 includes a first wire bundle 2 and a second wire bundle 3. The first wire bundle 2 includes multiple wires 4 and the second wire bundle 3 includes one or multiple wires 4. In the mode shown in the drawings, the first wire bundle 2 includes three wires 4. The second wire bundle 3 includes only one wire 4. In the present specification, a mode including only one wire 4 is also referred to as a wire bundle, as with the second wire bundle 3.

Figure 2A:
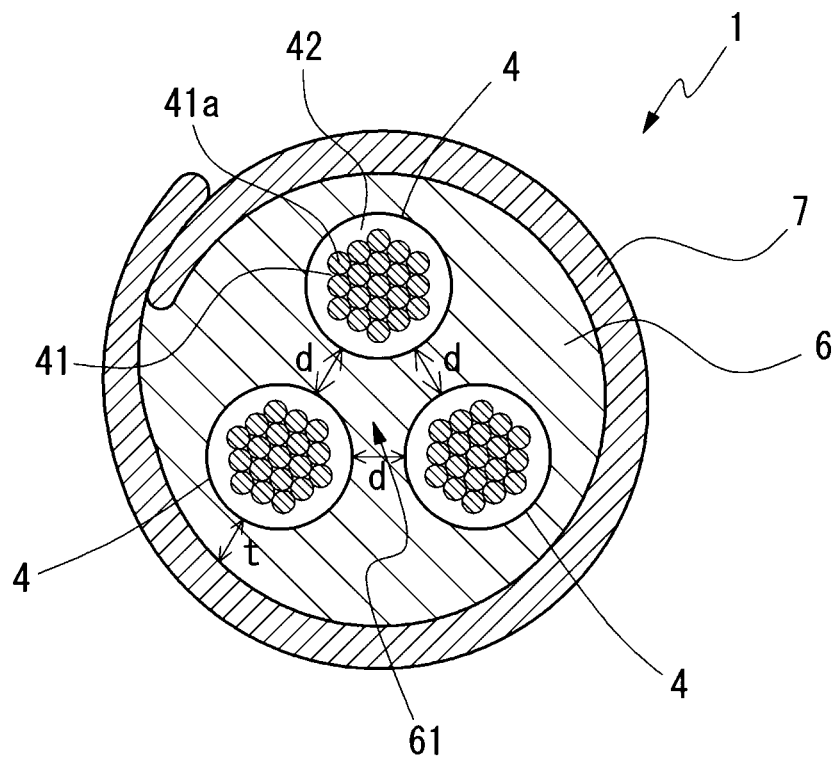
FIGS. 2A and 2B are diagrams showing cross-sections of the above-described wire harness at a reference position.
Figure 2B:
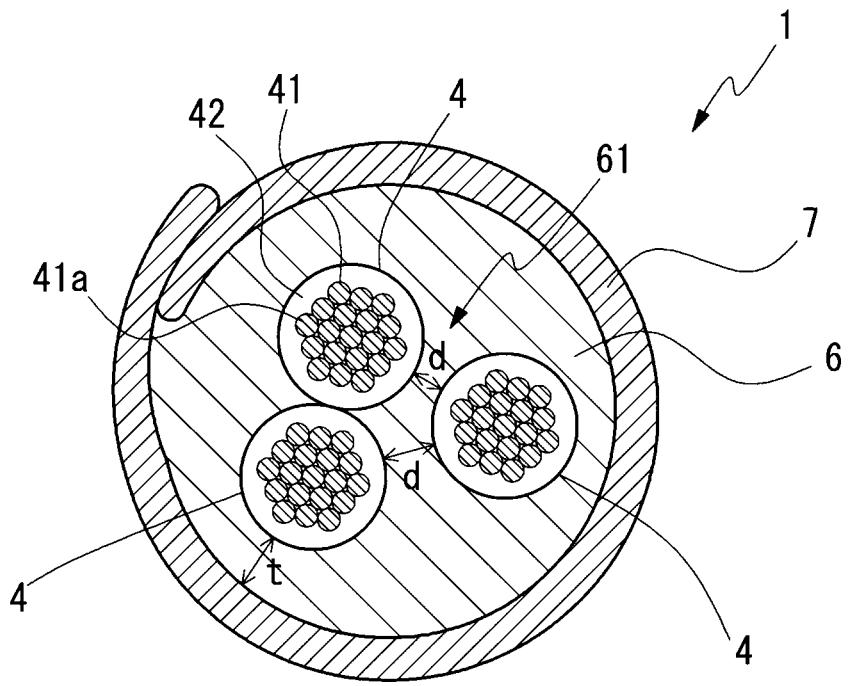
Figure 3:
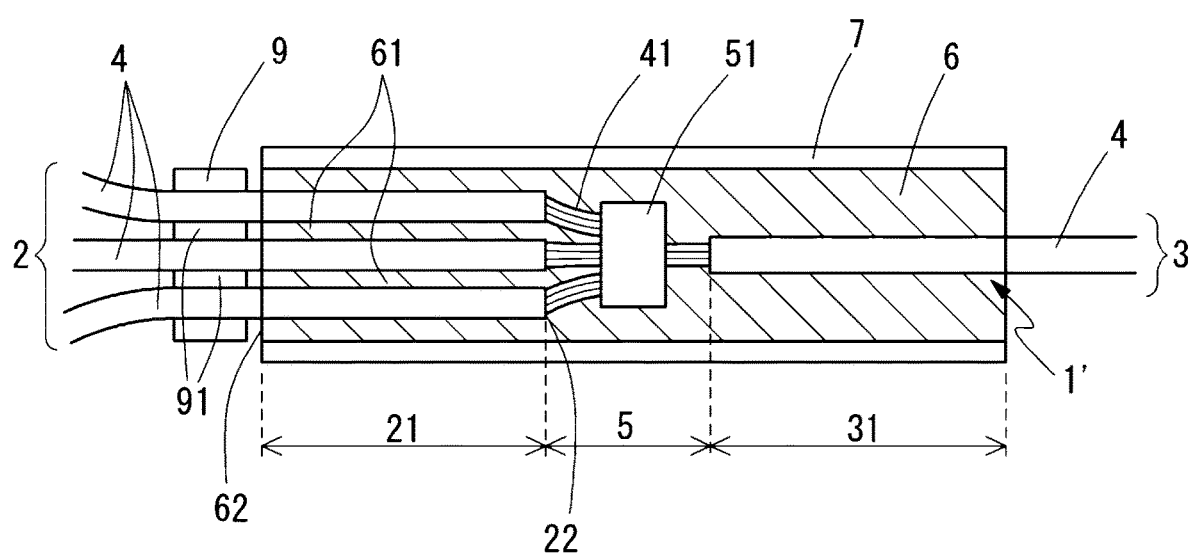
FIG. 3 is a side view illustrating formation of a waterproofing portion using a jig.

The wires 4 that constitute the first wire bundle 2 and the second wire bundle 3 each include a conductor 41 and an insulating covering 42 covering the outer circumference of the conductor 41 (see FIGS. 2A and 2B). Each wire 4 includes an exposed portion at which the insulating covering 42 is removed and the conductor 41 is exposed from the insulating covering 42. In the present wire harness 1, one (e.g., the one in the center) of the wires 4 constituting the first wire bundle 2 is one wire 4 (main wire) that is continuous with the one wire 4 constituting the second wire bundle 3, and at an intermediate portion of the main wire, the insulating covering 42 is removed to expose the conductor 41, and thus an exposed portion is formed. Exposed portions formed at end portions of the other wires 4 (branch wires) constituting the first wire bundle 2 are bonded to the exposed portion formed at the intermediate portion of the main wire by a splice portion 5 (splice body) that will be described next.

The splice portion 5 is formed between the first wire bundle 2 and the second wire bundle 3, and the first wire bundle 2 and the second wire bundle 3 extend in different directions on both sides of the splice portion 5. In the mode shown in the drawings, the first wire bundle 2 and the second wire bundle 3 extend in straight lines in mutually opposite directions on both sides of the splice portion 5. At the splice portion 5, the exposed portions of the wires 4 constituting the first wire bundle 2 and the second wire bundle 3 are mutually bonded. In the mode shown in the drawings, the exposed portions of the wires 4 are bonded at the splice portion 5 through crimping using a crimped terminal 51. Note that in the slice portion 5, if the conductors 41 constituting the exposed portions of the wires 4 can be electrically connected to and physically fastened to each other, the bonding of the exposed portions may be performed using any kind of means, and in addition to the mode using the crimped terminal 51, welding such as resistance welding and ultrasonic welding, and bonding using molten metal, such as soldering, can be given as examples. In the present wire harness 1, at the splice portion 5, two branch wires are bonded as the first wire bundle 2 to one main wire that is continuous from the first wire bundle 1 to the second wire bundle 3.

The wire harness 1 further includes a waterproofing portion 6 (waterproofing cover) in which the region including the splice portion 5 is covered with a resin material. The resin material constituting the waterproofing portion 6 integrally covers the splice portion 5, a covered region 21 of the first wire bundle 2, and a covered region 31 of the second wire bundle 3. Here, the covered regions 21 and 31 respectively indicate portions in which the conductors 41 of the wires 4 constituting the wire bundles 2 and 3, which are adjacent to the splice portion 5, are covered by the insulating coverings 42 in the first wire bundle 2 and the second wire bundle 3, and correspond to partial regions of the first wire bundle 2 and the second wire bundle 3 that oppose the splice portion 5.

In the first wire bundle 2 in which the multiple wires 4 are bundled, gaps are provided between the wires 4 in the covered region 21 covered by the waterproofing portion 6, the resin material constituting the waterproofing portion 6 fills the gaps, and thus an inter-wire filling portion 61 (inter-wire filling) is formed. The configuration of the waterproofing portion 6 including the inter-wire filling portion 61 will be described in detail later. The waterproofing portion 6 acts as a waterproofing material that suppresses a case in which water (also including electrolytes; the same applies in the description hereinafter) enters the splice portion 5.

Furthermore, the wire harness 1 includes a sheet member 7 (sheet). The sheet member 7 envelops the outer circumference of the waterproofing portion 6. Although the sheet member 7 is not necessarily provided in the wire harness 1, providing the sheet member 7 makes it possible to easily form the waterproofing portion 6, as will be described later regarding the method for manufacturing the wire harness 1. The sheet member 7 functions also as a protective member that protects the waterproofing portion 6 from contact with an external object or the like.

Although the materials constituting the portions of the wire harness 1 and the dimensions of the portions of the wire harness 1 are not particularly limited, examples of suitable materials and the like will be described hereinafter. Although the conductor 41 constituting the wire 4 may also be a single wire, it is preferable that the conductor 41 is a group of multiple strands 41a. The metal material constituting the strands 41a is not particularly limited, and copper, a copper alloy, aluminum, and an aluminum alloy can be given as examples thereof. The conductor 41 may be constituted by only strands 41a of one type, or may include strands 41a of two or more types. Also, the conductor 41 may include strands constituted by a material other than a metal material, such as organic fibers, in addition to the metal strands 41a. The insulating covering 42 included in the wire 4 is constituted by an insulating polymer material. Specific examples of the polymer material can include polyolefins such as polypropylene (PP), halogen-based polymers such as polyvinyl chloride (PVC), thermoplastic elastomers, and rubber. These polymer materials may individually constitute the insulating covering 42, or two or more may be mixed together. Various additives may also be added to the polymer material as needed. Examples of additives can include a flame retardant, a filler, and a coloring agent.

Although the cross-sectional area of the conductor of the wire 4 and the thickness of the insulating covering 42 are not particularly limited, for example, the cross-sectional area of the conductor can be in a range of 0.5 mm$^2$ or more and 5 mm$^2$ or less from the viewpoint of effectively using the effect of improving the waterproofing property resulting from mitigating stress in the waterproofing portion 6, or the like, which will be described later. Also, for example, the thickness of the insulating covering 42 can be in a range of 0.2 mm or more and 0.7 mm or less.

The type of the resin material constituting the waterproofing portion 6 is also not particularly limited, as long as it is an insulating polymer material. However, from the viewpoint of easily forming the waterproofing portion 6 including the inter-wire filling portion 61, it is preferable that the waterproofing portion 6 can be formed by arranging a thermoplastic resin, various curable resins, or the like at a predetermined location in a highly fluid state, and thereafter allowing it to solidify. In particular, it is preferable to use a curable resin as the resin material. Examples of the curable resin can include a light-curable resin, a heat-curable resin, a moisture-curable resin, and a two-component reaction curable resin. From the viewpoint of the ease of forming the waterproofing portion 6, among these resins, it is preferable to use a light-curable resin.

Although the resin type of the resin material constituting the waterproof portion 6 is also not particularly limited, examples thereof can include silicone-based resin, acrylic resin, epoxy-based resin, urethane-based resin, and the like. Among these, it is preferable to use acrylic resin. Examples of light-curable acrylic resin can include urethane (meth) acrylate-based resins, epoxy(meth)acrylate-based resins, polyester (meth)acrylate-based resins, and the like. It is possible to use only one, or two or more types in combination as the resin material constituting the waterproofing portion 6. Various additives may also be added to the resin material as needed. Examples of additives can include a reaction starting agent, a flame retardant, a filler, and a coloring agent.

If the wire harness 1 includes the sheet member 7, the material constituting the sheet member 7 is not particularly limited, as long as it is an insulating polymer material. Examples of polymer materials can include polyolefins such as polypropylene, halogen-based polymers such as PVC, polyesters such as polyethylene terephthalate, and polyamides such as nylon. Various additives may also be added to the polymer material as needed. Also, from the viewpoint of ease when arranging and fixing the sheet member 7 on the predetermined region of the outer circumference of the splice portion 5 via the waterproofing portion 6, it is preferable that the sheet member 7 is constituted by adhesive tape having an adhesion layer on which a bonding agent or an adhesive is arranged. In this case, the surface on which the adhesion layer is provided is the surface that is to be in contact with the waterproofing portion 6. If the resin material constituting the waterproofing portion 6 is a light-curable resin, it is preferable that the sheet member 7 is composed of a transparent material through which the light used to cure the resin material passes, such that the resin material is cured through exposure to light via the sheet member 7.

Configuration of Waterproofing Portion

Here, the waterproofing portion 6 provided in the wire harness 1 will be described in detail. As described above, the waterproofing portion 6 integrally covers the splice portion 5, and the covered regions 21 and 31 of the first wire bundle 2 and the second wire bundle 3 with a resin material in the wire harness 1.

The inter-wire filling portion 61 is formed in the waterproofing portion 6 in the region covering the covered region 21 of the first wire bundle 2. As shown in FIGS. 2A and 2B, in the inter-wire filling portion 61, the resin material fills the region between the wires 4 and covers the entire circumference of at least one of the wires 4 constituting the first wire bundle 2. Here, the state in which the resin material covers the entire circumference of the wire 4 indicates a state in which the resin material continuously surrounds the outer circumference of one wire 4 without another wire 4 being interposed therebetween. That is, at the position at which the inter-wire filling portion 61 is formed, at least one wire 4 is not in direct contact with an adjacent wire 4, and the resin material is in contact with the entire outer circumferential surface of the insulating covering 42 of that wire 4.

At the position at which the inter-wire filling portion 61 is formed, the number of wires 4 on whose entire circumferences the resin material is arranged is not particularly limited, as long as it is one or more. In the state shown in FIG. 2A, all three of the wires 4 are not in direct contact with the adjacent two wires 4, and the entire circumferences of the three wires 4 are respectively covered and have the resin material arranged thereon. That is, the resin material fills the entire region between the wires 4. On the other hand, in the mode shown in FIG. 2B, the two wires 4 on the left side are in contact with each other but are not covered by the resin material over their entire circumferences. However, the entire circumference of the wire 4 on the right side is covered by the resin material but is not in contact with the other two wires 4.

In the wire harness 1 according to the present embodiment, the waterproofing portion 6 covering the splice portion 5 and the covering regions 21 and 31 has the inter-wire filling portion 61 at the position of the covered region 21 of the first wire bundle 2, whereby the property by which the waterproofing portion 6 waterproofs the splice portion 5 can be improved. That is, in the covered region 21, at least one of the wires 4 constituting the first wire bundle 2 is not in contact with the adjacent wires 4 and the entire circumference thereof including the regions between the wire 4 and the adjacent wires 4 is surrounded by the resin material, and it is thereby possible to exhibit a high waterproofing property compared to the case where all of the wires 4 are in contact with the adjacent wires 4 and the region filled with the resin material is not sufficiently included between the wires. Two mechanisms are envisioned for improving the waterproofing ability due to the presence of the inter-wire filling portion 61.

A first mechanism is an increase in the adhesive strength resulting from an increase in the area of contact between the waterproofing portion 6 and the wire 4. That is, in the inter-wire filling portion 61, the resin material is arranged in contact with the entire circumference of at least one wire 4, whereby the total area of the surface of contact at which the resin material is in contact with the insulating covering 42 of the wires 4 constituting the first wire bundle 2 is increased compared to the case where there is a region at which the resin material is not arranged along the circumferential direction of the wires 4. Thus, the adhesive strength with respect to the wires 4 is increased in the overall waterproofing portion 6 constituted by the resin material. As a result, the waterproofing portion 6 exhibits a high waterproofing ability.

A second mechanism is a reduction of the influence of a change in the temperature resulting from mitigation of stress in the resin material. In the wire harness 1, when the splice portion 5 or a portion nearby undergoes a change in temperature, the waterproofing portion 6 and the insulating coverings 42 of the wires 4 expand and contract. However, the waterproofing portion 6 and the insulating covering 42 are normally constituted by different materials, and the expansion and contraction behaviors in response to a change in temperature are different from each other. Thus, when undergoing a change in temperature, the waterproofing portion 6 and the insulating coverings 42 are less likely to follow each other's deformation, and stress occurs between the waterproofing portion 6 and the insulating coverings 42. Due to this stress, the waterproofing portion 6 separates from the surfaces of the insulating coverings 42 in some cases. In particular, after the waterproofing portion 6 and the insulating coverings 42 undergo heating, separation of the waterproofing portion 6 is likely to occur accompanying contraction that occurs during cooling. This is because various curable resins that are commonly used as waterproofing materials often have lower thermal contraction rates than materials that are often used as the insulating coverings 42 of the wires 4, such as PVC or polyolefin, and thus when the waterproofing portion 6 is formed using such a curable material, the waterproofing portion 6 is not likely to follow the contraction of the insulating coverings 42.

However, in the wire harness 1 according to the present embodiment, the waterproofing portion 6 includes the inter-wire filling portion 61, and the resin material fills the region between the wires 4 in the covered region 21 of the first wire bundle 2. That is, the total amount of resin material constituting the waterproofing portion 6 is greater compared to the case where the wires 4 are in contact with each other and the resin material does not sufficiently fill the region between the wires 4. This means that the amount of the resin material that can contribute to stress mitigation is greater, and the stress that occurs between the waterproofing portion 6 and the insulating covering 42 due to a change in temperature can be effectively mitigated in the resin material constituting the waterproofing portion 6, even if a temperature change occurs in the splice portion 5 or its vicinity. As a result, even if a temperature change is undergone, separation is not likely to occur between the waterproofing portion 6 and the insulating covering 42, and the state in which the waterproofing portion 6 indicates a high waterproofing property is more likely to be maintained even after a change in temperature.

In this manner, in the wire harness 1 according to the present embodiment, due to having the inter-wire filling portion 61, the waterproofing portion 6 can exhibit a high waterproofing property and can maintain the high waterproofing property even after a change in temperature. Due to the fact that the high waterproofing property can be maintained even after a change in temperature, the present wire harness 1 can be preferably applied in an environment that is likely to come into contact with water and frequently undergoes a change in temperature, such as an automobile interior. As described above, in the inter-wire filling portion 61, the number of wires 4 whose entire circumferences are covered by the resin material is not limited as long as the resin material is arranged covering the entire circumference of at least one of the wires 4 constituting the first wire bundle 2, and as shown in FIG. 2B, even if the resin material covers only one wire 4, the effect of improving the waterproofing property can be sufficiently obtained. However, from the viewpoint of further improving the waterproofing property, the greater the number of wires 4 that are covered, the more preferable it is. As shown in FIG. 2A, a mode in which the resin material covers the entire circumferences of all of the wires 4 constituting the first wire bundle 2 is most preferable. This is because the areas of contact between the waterproofing portion 6 and the insulating coverings 42 of the wires 4 are greater and the amount of resin material that contributes to stress mitigation is greater.

In the covered region 21, the position at which the inter-wire filling portion 61 is provided in the waterproofing portion 6 is not particularly limited, and the inter-wire filling portion 61 may be formed over the entire covered region 21 along the axial direction of the wire harness 1, and the inter-wire filling portion 61 may also be formed only in a partial region. However, from the viewpoint of effectively suppressing a circumstance in which the waterproofing portion 6 separates from an edge 62 or the vicinity thereof and water can no longer be blocked from entering the splice portion 5, the inter-wire filling portion 61 is preferably formed at a position located away from the splice portion 5 toward the waterproofing portion edge 62 to a certain extent. For example, it is preferable that the waterproofing portion 6 covers the covered region 21 and the inter-wire filling portion 61 is formed at least a reference position P that is set at a position located at a distance La of 10 mm from a center C (position corresponding to the center of the splice portion 5 or the position of the center of the bonding means, such as the crimped terminal 51, a welded portion, or a soldered portion, along the wire harness 1) of the splice portion 5. Alternatively, it is preferable that the waterproofing portion 6 covers the covered region 21 and the inter-wire filling portion 61 is formed at least the reference position P set at a position located at a distance Lb of 2 mm from the edge 22 of the covered region 21 that is in contact with the splice portion 5. Note that the reference position P for determining whether or not the inter-wire filling portion 61 is included may be set based on the distance La from the center C of the splice portion 5 or based on the distance Lb from the edge 22 of the covered region 21, but the reference position P is preferably set based on the distance Lb from the edge 22 of the covered region 21 if the distance from the center C of the splice portion 5 to the edge 22 of the covered region 21 is 10 mm or more, or the like.

Furthermore, at the above-described reference position P, it is preferable that a gap of a distance d that is 3% or more of the thickness of the insulating covering 42 is present between at least two wires 4 selected from the wires 4 constituting the first wire bundle 2, and the inter-wire filling portion 61 is formed by filling the gap. Here, the distance d of the gap indicates the distance between the outer circumferential surfaces of the two wires 4 of interest, and is measured at the position at which the gap between the two wires 4 is at its narrowest. Also, the thickness of the insulating covering 42 is defined as the average value of the thickness over the entire circumference of the conductor 41. In the mode shown in FIG. 2A, gaps with a distance d that is 3% or more of the thickness of the insulating coverings 42 are formed between all three of the wires 4, and the resin material fills the gaps. In the mode shown in FIG. 2B, gaps are formed between the one wire 4 and the other two wires 4, gaps with a distance d that is 3% or more of the thickness of the insulating coverings 42 are formed, and the gaps are filled with the resin material.

It is particularly preferable that, at the reference position P, as shown in FIG. 2A, gaps are present between all of the wires 4 constituting the first wire bundle 2 and the adjacent wires 4, and the gaps are filled with the resin material. In this case, it is preferable that the maximum value of the distance d is at least 3% or more of the thickness of the insulating covering 42. Here, the maximum value of the distance d indicates the maximum distance d between any one wire 4 and one other wire 4 adjacent to the one wire 4 among all of the multiple wires 4 constituting the wire bundle 2. More preferably, not only the maximum value of the distance d, but also the distances d between all of the wires 4 and the adjacent wires 4 are preferably 3% or more of the thickness of the insulating covering 42.

As described above, by defining the amount of the resin material that fills the region between the wires 4 as a percentage with respect to the thickness of the insulating covering 42, it is possible to achieve mitigation of stress that occurs between the insulating covering 42 and the waterproofing portion 6 with a sufficient volume of the resin material with respect to the volume of the insulating covering 42. As a result, the stress that occurs during a change in temperature between the insulating covering 42 and the waterproofing portion 6 can be effectively mitigated by the resin material constituting the waterproofing portion 6 and thus separation of the waterproofing portion 6 can be suppressed. More preferably, the distance d (maximum value of the distance d) that is 3% or more of the thickness of the insulating covering 42 as described above is preferably 10% or more or 20% or more of the thickness of the insulating covering 42. Although an upper limit is not particularly provided for the distance d (the maximum value of the distance d), from the viewpoint of avoiding use of an excessive amount of the resin material and an increase in the diameter of the waterproofing portion 6, the distance d is preferably 300% or less, and furthermore 100% or less of the thickness of the insulating covering 42. Also, the distance d is preferably less than or equal to the outer diameter of the wires 4.

The distance between the wires 4 can also be defined at the position of the edge 62 of the waterproofing portion 6, instead of being defined at a position inside of the waterproofing portion 6 with respect to the edge 62 of the waterproofing portion 6, that is, at the reference position P set at the position toward the splice portion 5. The position of the edge 62 corresponds to being farther away from the splice portion 5 than the reference position P is, and a greater distance between the wires 4 is more easily ensured at the position of the edge 62 than at the reference position P. For example, at the position of the edge 62, it is preferable that the distance of a gap formed between at least two wires 4 selected from the wires 4 constituting the first wire bundle 2, or the distance of the gap or the maximum value thereof in a mode in which the gaps are formed between all of the wires 4 constituting the first wire bundle 2 and the adjacent wires 4 is 50% or more and furthermore 150% or more of the thickness of the insulating covering 42.

In order to protect the splice portion 5 from contact with water or the like, the waterproofing portion 6 needs to cover the entire circumference of the splice portion 5, but it is preferable that the waterproofing portion 6 covers not only the splice portion 5 but also the entire circumferences of the covered regions 21 and 31 on both sides. Even if the sheet member 7 is arranged on the outer circumference of the waterproofing portion 6, it is preferable that the resin material is arranged covering the entire circumferences of the splice portion 5 and the covered regions 21 and 31 between the sheet member 7 and the splice portion 5 and between the sheet member 7 and the covered regions 21 and 31, and thus the waterproofing portion 6 is formed. Due to the waterproofing portion 6 being formed on the entire circumferences of the splice portion 5 and the covered regions 21 and 31, the waterproofing property is likely to be increased, and it is possible to effectively protect the splice portion 5 from the occurrence of stress resulting from contact with an external object or the like, and a reduction in insulation. Note that from the viewpoint of sufficiently using these effects, the thickness of the waterproofing portion 6 in the outer circumferences of the covered regions 21 and 31 need only be 50% or more, more preferably 100% or more, even more preferably 120% or more, and even more preferably 150% or more of the outer diameter of the wires 4 with respect to the distance t from the outer surfaces of the wires 4 constituting the covered regions 21 and 31 to the outer edge of the waterproofing portion 6.

Other Modes

In the mode described above, in a wire harness 1 including a first wire bundle 2 including multiple wires 4 and a second wire bundle 3 including one wire 4, and including a splice portion 5 between the wire bundles 2 and 3, a waterproofing portion 6 is provided in the region including the splice portion 5, and an inter-wire filling portion 61 is formed in a region of the waterproofing portion 6 corresponding to the covered region 21 of the first wire bundle 2. However, in the covered region adjacent to the splice portion 5, the specific mode of the wire harness 1 and the waterproofing portion 6 is not particularly limited, as long as the inter-wire filling portion 61 obtained by filling the region between the wires with a resin material is formed covering the entire circumference of at least one of the multiple wires 4 constituting a wire bundle. For example, in the above-described mode, if the second wire bundle 3 also includes not only one but multiple wires 4, as long as the inter-wire filling portion 61 is formed in at least the covered region 21 of the first wire bundle 2 or the covered region 31 of the second wire bundle 3, it is possible to improve the waterproofing property achieved by the waterproofing portion 6 compared to the case where the inter-wire filling portion 61 is not formed, but it is possible to further improve the waterproofing property achieved by the waterproofing portion 6 if the inter-wire filling portion 61 is formed in both the covered region 21 of the first wire bundle 2 and the covered region 31 of the second wire bundle 3.

Also, as described above, there is no limitation to the intermediate splice portion obtained by bonding multiple wires 4 at an intermediate portion of the wire harness 1, and the waterproofing property can be improved by similarly providing the inter-wire filling portion 61 in the waterproofing portion 6 covering the splice portion 5 also in a terminal end splice portion obtained by bonding the multiple wires 4 at an end portion of the wire harness 1. Although waterproofing is often carried out due to the terminal end splice portion being accommodated in a cap and the resin material filling a space inside of the cap, the inter-wire filling portion 61 need only be formed in the space inside of the cap in this case. Alternatively, although the multiple wires 4 are collectively connected to a common connection terminal at the terminal end portion in some cases, in this case, the waterproofing portion 6 need only be formed by covering the bonding portion at which the multiple wires 4 are fastened to the connection terminal with the resin material and the inter-wire filling portion 61 need only be provided in the waterproofing portion 6. In any mode, the number of the wires 4 constituting the wire bundle is preferably 3 or more and 20 or less from the viewpoint of improving the effect of improving the waterproofing property as a result of mitigating stress in the waterproofing portion 6, and the like.

[2] Method for Manufacturing Wire Harness

Next, a method for manufacturing the wire harness according to an embodiment of the present disclosure will be described.

Overview of Manufacturing Method

In the present manufacturing method, the above-described wire harness 1 obtained by covering the splice portion 5 with the waterproofing portion 6 is manufactured by sequentially executing (1) a bonding step, (2) an isolation step, and (3) a waterproofing step. Hereinafter, the steps shown in FIGS. 3 and 4A to 4E will be described sequentially.

(1) Bonding Step

In the bonding step, a harness precursor 1' obtained by bonding the multiple wires 4 at the splice portion 5 is produced. First, a needed number of wires 4 cut to a predetermined length are prepared. In each wire 4, an exposed portion is formed by removing the insulating covering 42 to expose the conductor 41. Also, the wires 4 are bundled together to form the wire bundles 2 and 3. In the mode shown in FIG. 3, the exposed portions are formed at the intermediate portion of one main wire and at the terminal end portions of two branch wires, and the three wires are bundled together, whereby a first wire bundle 2 obtained by bundling together three wires 4 and a second wire bundle 3 formed by one wire 4 are included. Furthermore, the exposed portions of the wires 4 are bonded together using a bonding means such as a crimped terminal 51 to form the splice portion 5, and thus the harness precursor 1' is obtained. In the mode shown in the drawings, the first wire bundle 2 and the second wire bundle 3 are arranged so as to extend in opposite directions to form the splice portion 5 between the wire bundles 2 and 3, the two branch wires are bonded to the intermediate portion of the one main wire, the main wire and the two branch wires constitute the first wire bundle 2, and the main wire constitutes the second wire bundle 3.

(2) Isolation Step

In the isolation step, distance is provided between the multiple wires 4 constituting the first wire bundle 2 in the harness precursor 1' obtained in the bonding step. That is, in the region of the first wire bundle 2 that is to be covered by the resin material in the following waterproofing step as the covered region 21, at least two of the wires 4 constituting the first wire bundle 2 are put in a state of not being in contact with each other, and distance is provided between these two wires 4. Preferably, none of the wires 4 constituting the first wire bundle 2 are in contact with each other, and distances are provided between all of the wires 4. In the isolation step, when the distance is provided between the wires 4, the state in which the distance has been provided is maintained until the following waterproofing step is complete.

In the isolation step, in order to reliably form the state in which the distance has been provided between the wires 4 and to stably maintain this state, it is preferable to use a jig 9. Although the structure of the jig 9 will be described later using specific examples, the jig 9 includes an interposed portion 91 that is interposed between the multiple wires 4 constituting the first wire bundle 2. By interposing the interposed portion 91 between the wires 4, it is possible to provide the distance between the wires 4. In the mode shown in FIG. 3, the interposed portions 91 of the jig 9 are interposed and distances are provided between all of the three wires 4 constituting the first wire bundle 2.

In the splice portion 5 and the covered region 21 covered by the waterproofing portion 6, the jig 9 is arranged at a position located away from the splice portion 5 toward the base end (left side in FIG. 3) of the first wire bundle 2 relative to the planned position of forming the waterproofing portion 6, in order to be able to form a sufficient distance between the wires 4 and in order not to hinder the jig 9 when forming the waterproofing portion 6. Furthermore, when the sheet member 7 is arranged on the outer circumference of the waterproofing portion 6, the position at which the jig 9 is arranged is a position spaced apart from the splice portion 5 toward the base end of the first wire bundle 2 relative to the position at which the sheet member 7 is arranged.

(3) Waterproofing Step

In the isolation step, when the distance is provided between the wires 4 constituting the first wire bundle 2 of the harness precursor 1', the next waterproofing step is executed in that state. In the isolation step, if the jig 9 is used, the jig 9 is also installed in the first wire bundle 2 while the waterproofing step is carried out. In the waterproofing step, the splice portion 5 and the covered region 21 and 31 of the harness precursor 1' are covered integrally by the resin material to form the waterproofing portion 6. In the mode shown in FIG. 3, the splice portion 5 and the covered regions 21 and 31 of the harness precursor 1' are all covered integrally by the resin material.

Through the isolation step, distance is provided between the wires at a position corresponding to the covered region 21 of the first wire bundle 2, and thus gaps are formed, whereby in the waterproofing step, the resin material is introduced also into the gaps between the wires 4 when the resin material is arranged in the region including the covered region 21. Accordingly, the waterproofing portion 6 including the inter-wire filling portion 61, which is obtained by covering the entire circumference of at least one wire 4 in the covered region 21 and filling the region between the wires with the resin material, can be formed.

The specific method for forming the waterproofing portion 6 using the resin material need only be selected as appropriate according to the type and properties of the resin material, and the shape, position, and the like of the waterproofing portion 6 to be formed. However, if the waterproofing portion 6 is formed by preparing, in a highly fluid state, a resin composition that is to be the resin material that is solidified to form the waterproofing portion 6, arranging the resin composition at a predetermined position including the splice portion 5, and thereafter solidifying the resin composition, the waterproofing step is easily executed, and a waterproofing portion 6 that is closely adhered to the splice portion 5 and the covered regions 21 and 31 is likely to be formed. Among these, it is preferable to form the waterproofing portion 6 by arranging a light-curable resin composition at a predetermined position including the splice portion 5 and thereafter curing the composition through exposure to light.

Also, when the waterproofing step is executed using a high-fluidity material such as the light-curable resin composition, it is preferable to use the sheet member 7 from the perspective of improving handleability of the material. An example of a waterproofing step in which the sheet member 7 is used is shown in FIGS. 4A to 4E. First, the sheet member 7 is prepared in a sheet preparation step shown in FIG. 4A. The sheet member 7 used here corresponds to a sheet member 7 that has been spread out into a flat shape and is to surround the waterproofing portion 6 by being bent into a tube shape in the wire harness 1 that is ultimately manufactured. When the sheet member 7 is constituted as adhesive tape having an adhesive layer, the adhesive layer is used as the outer surface, that is, the surface facing upward.

Next, in a resin arrangement step shown in FIG. 4B, a liquid resin composition 6' in an unsolidified state is arranged on the outer surface of the sheet member 7. Then, in a harness arrangement step shown in FIG. 4C, the harness precursor 1' is arranged on the outer surface of the sheet member 7 on which the resin composition 6' has been arranged. At this time, the splice portion 5 and the covered regions 21 and 31 of the harness precursor 1' is arranged at a position at which the resin composition 6' is present.

Next, in an envelopment step shown in FIG. 4D, the splice portion 5 and the covered regions 21 and 31 of the harness precursor 1' are enveloped by the surface of the sheet member 7 on which the resin composition 6' has been arranged. At this time, the circumference of the harness precursor 1' is preferably enveloped by the sheet member 7 such that the resin composition 6' that is arranged on the surface of the sheet member 7 extends over the entire circumference of the splice portion 5 and the covered regions 21 and 31. When the sheet member 7 is constituted as adhesive tape, the state in which the harness precursor 1' is enveloped using the adhesion achieved by the adhesive layer is likely to be held stable. Until the envelopment step, the resin composition 6' is in a highly-fluid unsolidified state.

Finally, in a solidification step shown in FIG. 4E, the resin composition 6' enveloped by the sheet member 7 is solidified to obtain the waterproofing portion 6. Solidification need only be performed using a method corresponding to the type of the resin composition 6'. In the case where the resin composition 6' is a light-curable resin, if the sheet member 7 is constituted using a material through which light to be used in curing passes, the resin composition 6' is cured in the region enveloped by the sheet member 7 through exposure to light such as ultraviolet light (UV) from the outside of the sheet member 7, and a structure in which the sheet member 7 is closely adhered to the outer circumference of the waterproof portion 6 can be formed as shown in FIGS. 1, 2A, and 2B. If the jig 9 has been used in the previous isolation step, the jig 9 is left as arranged until at least the envelopment step is complete and preferably, until the solidified step is complete, and is thereafter removed.

Jig Used in Isolation Step

Here, the structure of the jig 9 used in the isolation step will be described using examples. The jig 9 may have any kind of specific shape as long as it includes the interposed portion 91 that can be interposed between the wires 4 constituting the wire bundle 2. However, here, a column-shaped jig 9 will be described. As shown in FIG. 5B, the jig 9 (9Y) has a column shape, and three different examples of shapes of end surfaces of the column shape will be described below.

Figure 5A:
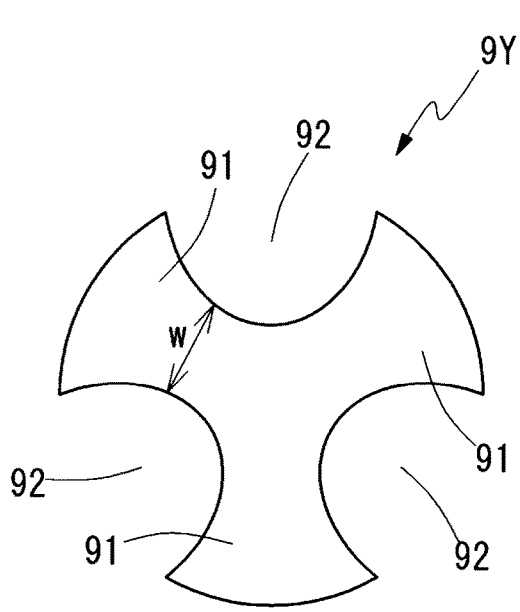
FIGS. 5A to 5D are diagrams showing a jig that is to be used to manufacture the above-described wire harness.
Figure 5B:
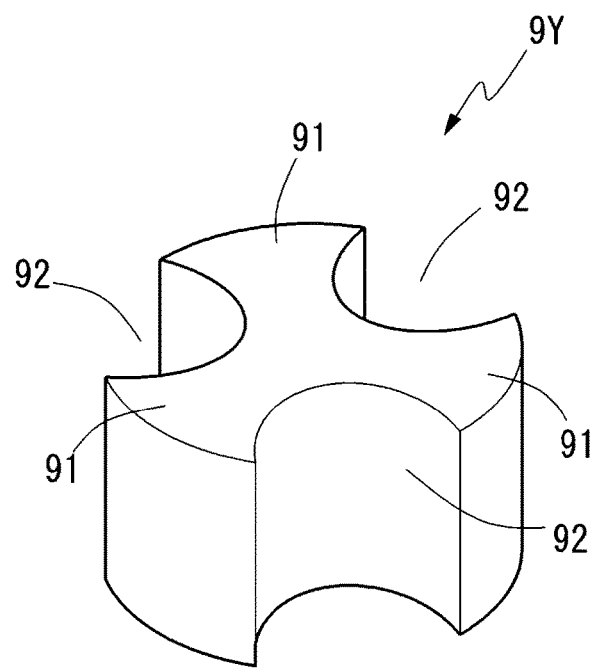

In a first example, in FIGS. 5A and 5B, the end surface shape and the overall shape of a Y-shaped jig 9Y are shown. The Y-shaped jig 9Y has a shape in which portions corresponding to the wire accommodation portions 92 have been removed from a circular column shape, and multiple interposed portions 91 protrude radially outward from the central axis of the column shape. The interposed portions 91 are arranged at equal angular intervals around the central axis. The portions between the adjacent interposed portions 91 are wire accommodation portions 92 that are recessed in smooth curved surface shapes toward the central axis. The curved surface shape of the wire accommodation portion 92 is designed as a shape that can accommodate one wire 4 constituting the wire harness 1. Also, the numbers of the interposed portions 91 and the wire accommodation portions 92 match the number of the wires 4 (in the mode shown in the drawings, three) constituting the wire bundle 2.

Figure 6A:
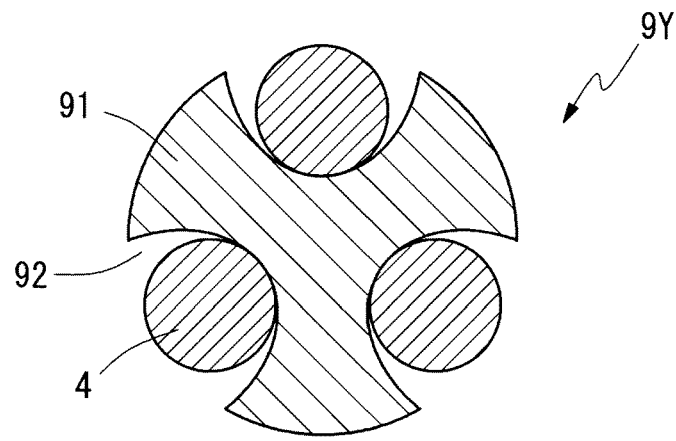
FIGS. 6A to 6C are cross-sectional views illustrating an arrangement of wires in the jig.

In the isolation step performed during manufacture of the wire harness 1, as indicated by the cross-sectional view in FIG. 6A, each wire 4 constituting the wire bundle 2 is arranged in a wire accommodation portion 92. Accordingly, the interposed portions 91 are interposed between the wires 4. As a result, distances are provided between the wires 4. When the Y-shaped jig 9Y is used, in the waterproofing portion 6 formed using the waterproofing step, as shown in FIG. 2A, the multiple wires 4 constituting the wire bundle 2 are in a mutual arrangement similar to a circular ring shape, and the inter-wire filling portion 61 having a mode in which the entire circumference of each of the wires 4 is covered with the resin material is easily formed.

Figure 5C:
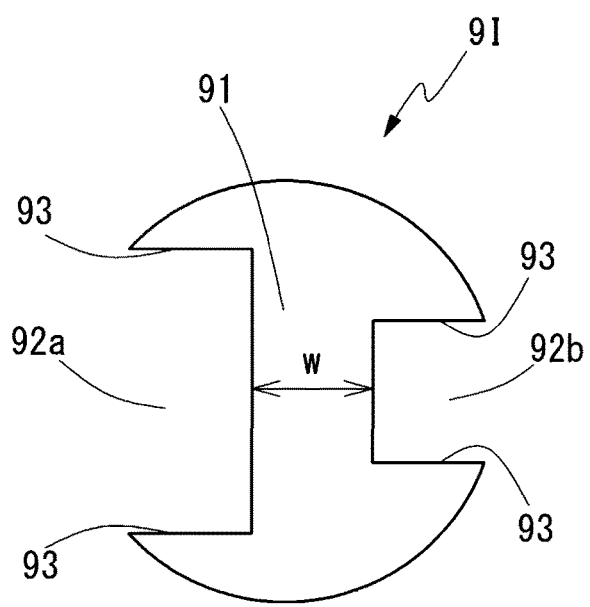
Figure 6B:
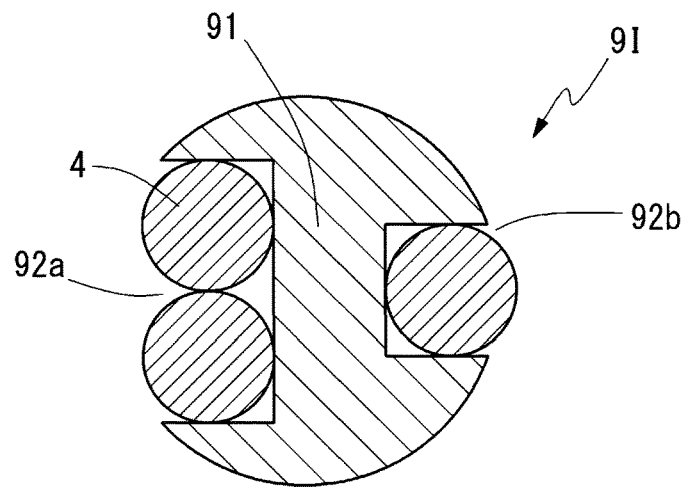

In a second example of the jig 9, FIG. 5C shows the end surface shape of an I-shaped jig 91. The I-shaped jig 91 has a shape obtained by removing the portions corresponding to the wire accommodation portions 92*a* and 92*b* from a circular column shape. In the I-shaped jig 91, partition-shaped interposed portions 91 are provided at the central portion of the column shape. Also, the wire accommodation portions 92*a* and 92*b* that can accommodate the wires 4 are provided on both sides of the interposed portions 91. The accommodation width (dimension in the vertical direction of FIG. 5C) of the wire accommodation portions 92*a* and 92*b* is defined by the interval between a pair of accommodation portion walls 93 that protrude outward from the interposed portion 91, and the accommodation portion 92*a* shown on the left side in FIG. 5C is a large-sized accommodation portion with a wide interval between the pair of accommodation portion walls 93, and as shown in FIG. 6B, two wires 4 are accommodated side by side therein. On the other hand, the accommodation portion 92*b* shown on the right side in FIG. 5C is a small-sized accommodation portion with a narrow interval between the pair of accommodation portion walls 93, and as shown in FIG. 6B, only one wire 4 can be accommodated therein.

If the I-shaped jig 91 is used, as shown in FIG. 6B, it is difficult to provide the distance between the multiple wires 4 arranged side by side in the large-sized accommodation portion 92*a*, but the distance is ensured between the two groups of wires accommodated in the two wire accommodation portions 92*a* and 92*b* separated by the interposed portions 91. When the I-shaped jig 91 is used, in the waterproofing portion 6 formed through the waterproofing step, as shown in FIG. 2B, the inter-wire filling portion 61 of the mode in which the entire circumference of some of the wires 4 constituting the wire bundle 2 is covered by the resin material is easily formed. The accommodation widths of the wire accommodation portions 92*a* and 92*b* need only be set such that the total number of the wires 4 accommodated in the two wire accommodation portions 92*a* and 92*b* matches the total number of the wires 4 constituting the wire bundle 2. In the mode shown in the drawings, two wires 4 can be stored in the large-sized accommodation portion 92*a* and one wire 4 can be stored in the small-sized accommodation portion 92*b*, and thus a total of three wires 4 can be accommodated. If there are two wires 4 constituting the wire bundle 2, two wire accommodation portions need only be constituted as the small-sized accommodation portions 92*b* that each accommodate only one wire 4. If there are four or more wires 4 constituting the wire bundle 2, two wire accommodation portions need only be constituted as the large-sized accommodation portions 92*a* that each accommodate multiple wires 4. Also, the accommodation widths of the large-sized accommodation portions 92*a* are not limited to two wires 4, and may be such that three or more wires 4 can be accommodated, and need only be increased in size accompanying an increase in the number of the wires 4 to be accommodated.

Figure 5D:
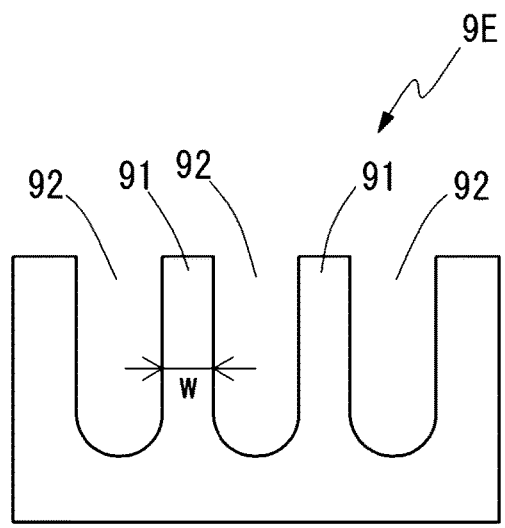

As a third example of the jig 9, FIG. 5D shows the end surface shape of an E-shaped jig 9E. The E-shaped jig 9E has a shape obtained by removing portions corresponding to the wire accommodation portions 92 from a quadrangular column shape. In the E-shaped jig 9E, multiple interposed portions 91 are provided side by side in parallel. Also, the portions between the adjacent interposed portions 91 are wire accommodation portions 92 that are smoothly recessed. The wire accommodation portions 92 can each accommodate one wire 4, and the number of the wire accommodation portions 92 matches the number of wires 4 constituting the wire bundle 2.

Figure 6C:
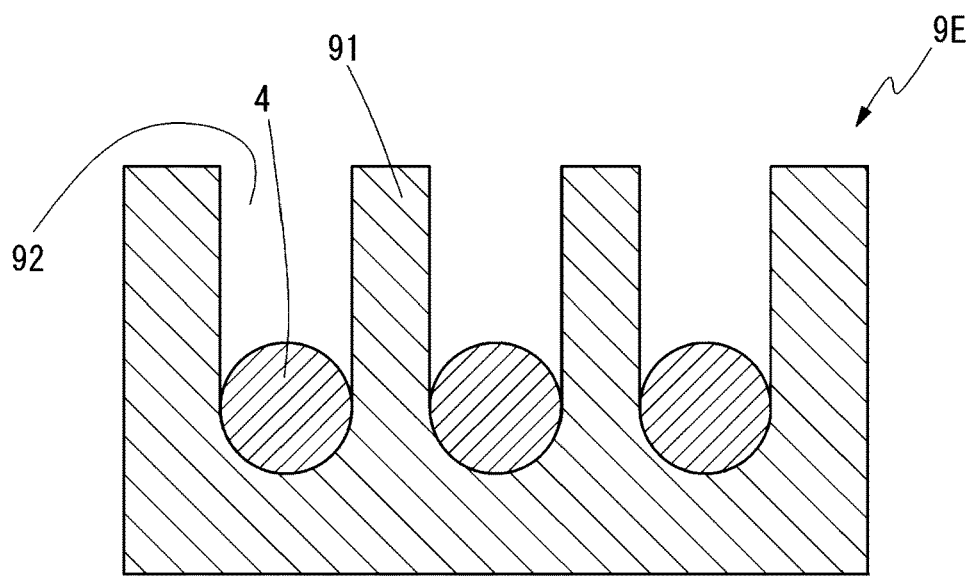

If the E-shaped jig 9E is used, as shown in FIG. 6C, the interposed portions 91 are interposed between the multiple wires 4 arranged side by side in one row, and thus a distance is provided between the adjacent wires 4. When the E-shaped jig 9E is used, in the waterproofing portion 6 formed through the waterproofing step, it is easy to form the inter-wire filling portion 61 having a mode in which the entire circumferences of the multiple wires 4 arranged side by side in one row are covered by the resin material. Note that the jig 9 shown in FIG. 3 corresponds to the E-shaped jig 9E. If the E-shaped jig 9E is used, a mode is mainly envisioned in which only one wire 4 is accommodated in each wire accommodation portion 92, but if the depths (dimensions in the vertical direction of FIG. 5D) of the wire accommodation portions 92 are sufficiently large, multiple wires 4 may be accommodated in a stacked manner in one wire accommodation portion 92.

It is sufficient to select which of the three types of jigs 9Y, 91, and 9E shown here as examples is to be used according to the number of the wires 4 constituting the wire bundle 2, the overall shape of the wire bundle 2 to be formed, and the like as appropriate. From the viewpoint of the manufacturability of the jig 9 and the ease of arranging the wires 4 in the jig 9, the I-shaped jig 91 is the most excellent among the three types. However, if the I-shaped jig 91 is used, as described above, it is difficult to provide the gap between the multiple wires 4 accommodated in the large-sized accommodation portion 92a, and it is difficult to form the inter-wire filling portion 61 by causing the resin material to sufficiently span between the wires 4 in the waterproofing step. Accordingly, if there is a large number of wires 4 constituting the wire bundle 2, or if gaps are to be formed between a large number of the wires 4 among the wires 4 constituting the wire bundle 2 and the gaps are to be filled with the resin material, it is more preferable to use the Y-shaped jig 9Y or the E-shaped jig 9E than the I-shaped jig 91. In particular, the E-shaped jig 9E can handle a limitless increase in the number of wire 4 due to a large number of the interposed portions 91 and the wire accommodation portions 92 being provided side by side. However, if the E-shaped jig 9E is used, the wires 4 constituting the wire bundle 2 are arranged side by side in one row, and therefore the wire bundle 2 takes up an area with a large width. In view of this, it can be said that if the number of wires 4 constituting the wire bundle 2 is not extremely large, it is most preferable to use the Y-shaped jig 9Y. If the Y-shaped jig 9Y is used, it is easy to form the waterproofing portion 6 including the inter-wire filling portion 61 between the wires 4 while consolidating the wire bundle 2 into a shape that does not significantly depart from a circular shape. If any of the three types of jigs 9 is used, the distance d of the interval provided between the wires 4 can be increased at the reference position P the larger the width w (minimum values of the distance separating the wire accommodation portions 92 (92a and 92b) on both sides of the interposed portion 91) of the interposed portion 91 is made.

As described above, the specific shape of the jig 9 is not limited to the mode of the three types described herein. For example, a jig is also conceivable in which the shape of the E-shaped jig 9E is combined with that of the Y-shaped jig 9Y or the I-shaped jig 91. That is, one or multiple interposed portions 91 with the partition shape similar to the interposed portion 91 of the E-shaped jig 9E need only be provided by partitioning the space in each of the wire accommodation portions 92 of the Y-shaped jig 9Y or the large-sized accommodation portion 92a of the I-shaped jig 91 into multiple spaces. By doing so, multiple wires 4 can be arranged in a state where distances are provided therebetween in the wire accommodation portions 92 of the Y-shaped jig 9Y and the large-sized accommodation portion 92a of the I-shaped jig 91. Also, the number of jigs 9 used in the isolation step is not limited to one, and it is also possible to use multiple jigs 9 by arranging them side by side in the axial direction of the wire bundle 2. For example, as with the wires 4 accommodated in the large-sized accommodation portion 92a of the I-shaped jig 91, in one jig 9, if distance is not sufficiently provided between the wires 4, sufficient distance is easily provided also between the wires 4 by arranging the interposed portion 91 of another jig 9 arranged side by side with the jig 9 between the wires 4.

Modified Examples of Waterproofing Step

As described above regarding the structure of the wire harness 1, if the sheet member 7 is provided on the outer circumference of the waterproofing portion 6, from the viewpoint of improving the waterproofing property and a property of protecting against damage and insulation failure, it is preferable that the waterproofing portion 6 in which the resin material is arranged covers the entire circumferences of the splice portion 5 and the covered regions 21 and 31 between the sheet member 7 and the splice portion 5 and between the sheet member 7 and the covered regions 21 and 31. However, if the fluidity of the resin composition 6' used to form the waterproofing portion 6 is high in the waterproofing step, or the like, there are cases in which it is difficult to solidify a sufficient amount of the resin composition 6' in the contained state between the sheet member 7 and the splice portion 5 and covered regions 21 and 31, and thus it is difficult to form the waterproofing portion 6.

For example, in the waterproofing step described above with reference to FIGS. 4A to 4E, the liquid resin composition 6' is arranged on the sheet member 7 in the resin arrangement step shown in FIG. 4B, and thereafter the harness precursor 1' is arranged on the resin composition 6' in the harness arrangement step shown in FIG. 4C. However, there are cases in which the splice portion 5 and the covered regions 21 and 31 of the harness precursor 1' come into direct contact with the sheet member 7 due to the resin composition 6' being removed such that it is extruded to the surrounding area due to the fluidity of the resin composition 6' and the gravitational force acting on the harness precursor 1'. In this state, when the subsequent envelopment step and the solidification step are carried out, at the position of the formed waterproofing portion 6 that is located below in the gravity direction in the stage of the harness arrangement step, a region in which the resin material is not arranged or a region in which the layer of the resin material is extremely thin may appear between the splice portion 5 and covered regions 21 and 31 and the sheet member 7. In view of this, two examples of a waterproofing step are given below, in which when the sheet member 7 is used, the entire circumferences of the splice portion 5 and the covered regions 21 and 31, including the portion arranged below in the gravity direction in the manufacturing step are covered and the waterproofing portion 6 in which the resin material is arranged is easily formed. Hereinafter, detailed description of portions held in common between steps described with reference to FIGS. 4A to 4E will be omitted.

Modified Example 1: Method Using Two-Stage Solidification

As a first modified example, a mode will be described in which the solidification of the resin composition 6' is performed in two stages instead of being performed in one stage. FIGS. 7A to 7G show the waterproofing step using solidification in two stages.

Figure 7A:
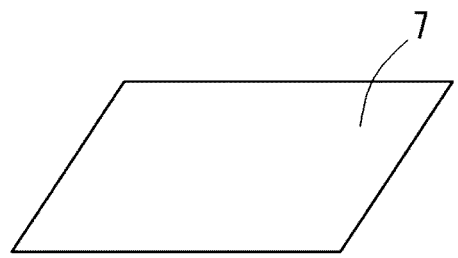
FIGS. 7A to 7G are diagrams illustrating a waterproofing step performed through two stages of solidification.
Figure 7B:
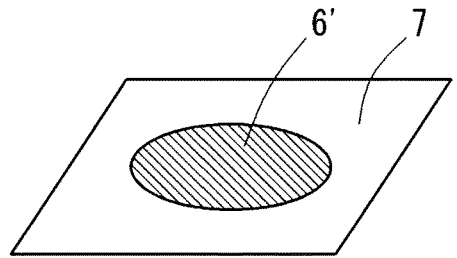

First, after a sheet preparation step shown in FIG. 7A, a first resin arrangement step shown in FIG. 7B is carried out. In the first resin arrangement step, the resin composition 6' that is to be solidified to be the resin material constituting the waterproofing portion 6 is arranged on the surface of the sheet member 7. The first resin arrangement step need only be performed similarly to the resin arrangement step shown in FIG. 4B in which solidification of the resin composition 6' is performed in one stage, but it is preferable that the amount of the resin composition 6' that is arranged is reduced compared to that case.

Figure 7C:
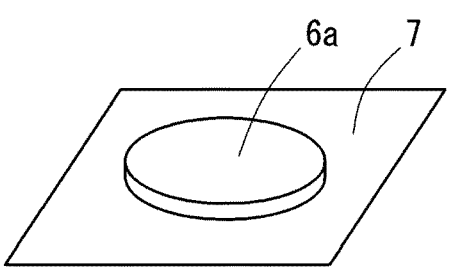

Next, the resin composition 6' arranged in the first resin arrangement step is solidified in the first solidification step shown in FIG. 7C and a first solidified portion 6a is formed. Solidification may be performed using a method corresponding to the type of the resin composition 6'. If the resin composition 6' is a light-curable resin, exposure to light such as ultraviolet rays (UV) may be performed. If the sheet member 7 is constituted using a material through which the light passes, exposure to light can be performed from the underside of the sheet member 7 to cure the resin composition 6'.

Figure 7D:
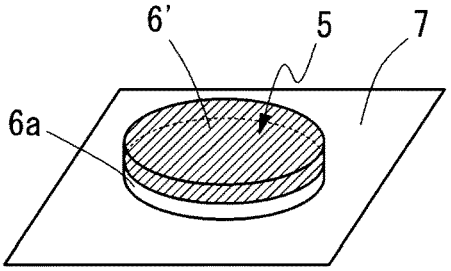

After the solidification of the resin composition 6' is complete, a second resin arrangement step shown in FIG. 7D is carried out. In the second resin arrangement step, the resin composition 6' that is to be solidified to be the resin material constituting the waterproofing portion 6 is arranged in the region including the outer surface of the first solidified portion 6a formed in the first solidification step on the outer surface of the sheet member 7. The resin composition 6' arranged here may be different from the resin composition 6' arranged in the first resin arrangement step, but from the viewpoint of simplicity of the manufacturing step and the product structure, it is preferable to use the same resin composition 6'. Also, from the viewpoint of improving the waterproofing property of the wire harness 1 to be manufactured, the amount of the resin composition 6' that is arranged in the second resin arrangement step is preferably greater than the amount of the resin composition 6' that was arranged in the first resin arrangement step and solidified in the first solidification step. Note that in the first solidification step, if the entire amount of the resin composition 6' arranged on the sheet member 7 in the first resin arrangement step is not solidified and a portion can be left on the layer of the solidified first solidified portion 6a in an unsolidified state, the step of newly arranging the resin composition 6' in the second resin arrangement step can be omitted, and the remaining unsolidified resin composition 6' can also be used as the resin composition 6' that is arranged in the second resin arrangement step.

Figure 7E:
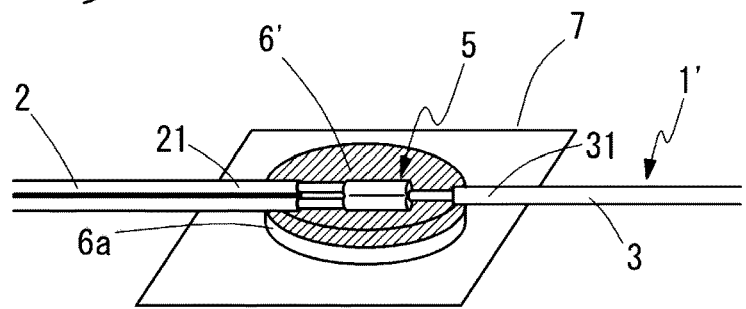

Next, in the harness arrangement step shown in FIG. 7E, the harness precursor 1' is placed on the outer surface of the sheet member 7. At this time, the position of the harness precursor 1' is adjusted such that the splice portion 5 and the covered regions 21 and 31 of the harness precursor 1' are arranged on the first solidified portion 6a via the layer of unsolidified resin composition 6' arranged in the second resin arrangement step.

Figure 7F:
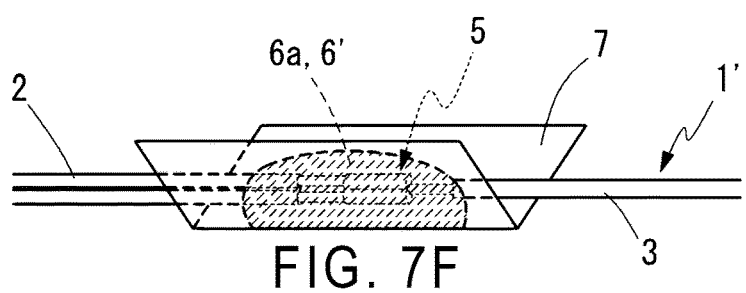
Figure 7G:
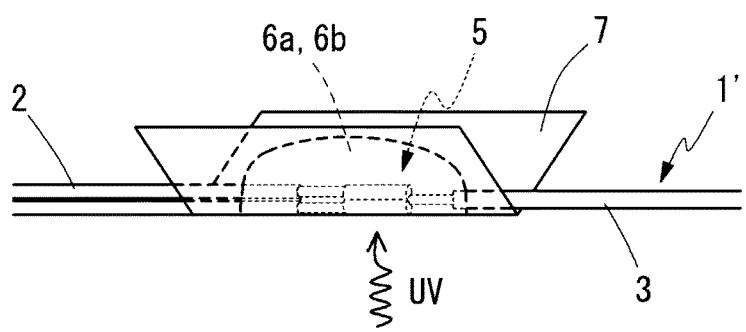

Next, the envelopment step shown in FIG. 7F and the second solidification step shown in FIG. 7G are carried out. These steps may be executed similarly to the envelopment step and the solidification step shown in FIGS. 4D and 4E regarding the case of performing solidification of the resin composition 6' in one stage. However, the resin composition 6' arranged in the first resin arrangement step has already been solidified in the previous first solidification step, and only the resin composition 6' that was arranged in the second resin arrangement step is solidified in the second solidification step. The resin composition 6' that was arranged in the second resin arrangement step is solidified to be the second solidified portion 6b.

In this manner, by performing the arrangement and solidification of the resin composition 6' in two stages, the first solidified portion 6a formed in the first solidification step and the second solidification portion 6b formed in the second solidification step are formed in the region that is enveloped by the sheet member 7 and surrounds the splice portion 5 and the covered regions 21 and 31. Through the second solidification step, the first solidified portion 6a and the second solidified portion 6b are bonded to each other. The manufactured wire harness 1 includes an aggregate of the first solidified portion 6a and the second solidified portion 6b as the waterproofing portion 6 covering the splice portion 5 and the covered regions 21 and 31. If the first solidified portion 6a and the second solidified portion 6b are formed using the same resin composition 6', the boundary between the two solidified portions 6a and 6b is not visible to the naked eye in many cases.

In the waterproofing portion 6 of the wire harness 1 to be manufactured, the resin material constituting the second solidified portion 6b and not the first solidified portion 6a fills the gap between the wires 4 constituting the first wire bundle 2 and constitutes the inter-wire filling portion 61. This is because only the resin composition 6' that is to be the second solidified portion 6b comes into contact with the harness precursor 1' in an unsolidified and highly fluid state. In this manner, mainly the second solidified portion 6b contributes to ensuring the waterproofing property of the waterproofing portion 6.

On the other hand, the first solidified portion 6a contributes to ensuring the layer of the resin material between the sheet member 7 and the splice portion 5 and covered regions 21 and 31, and contributes to protecting the splice portion 5 against physical damage and a reduction in insulation. Although the harness precursor 1' is placed in the harness arrangement step on the liquid resin composition 6' that was arranged in the second resin arrangement step, at this time, if the first solidification portion 6a is not formed on the outer surface of the sheet member 7, there is a possibility that the splice portion 5 and the covered regions 21 and 31 of the harness precursor 1' will come into direct contact with the sheet member 7 due to the resin composition 6' being removed such that it is extruded to the surrounding area due to the fluidity of the resin composition 6' and the gravitational force that acts on the harness precursor 1'. However, due to the first solidified portion 6a that has already been solidified being present below the liquid resin composition 6', even if removal of the liquid resin composition 6' occurs, the splice portion 5 and the covered regions 21 and 31 are in contact with the first solidified portion 6a instead being in direct contact with the sheet member 7 at the position at which the removal occurred. That is, the thickness of the layer composed of the resin material is ensured between the splice portion 5 and covered regions 21 and 31 and the sheet member 7 due to the first solidified portion 6a. In this state, due to the subsequent envelopment step and solidification step being performed, the waterproofing portion 6 at which the entire circumferences of the splice portion 5 and the covered regions 21 and 31 are covered by the resin material can be formed with high reliability between the sheet member 7 and the splice portion 5 and covered regions 21 and 31, including the portions that are located below in the gravity direction until the harness arrangement step.

Modified Example 2: Method Using Spacers

As a second modified example, a mode in which spacers are used in the formation of the waterproofing portion 6 will be described. FIGS. 8A to 8F show a waterproofing step using spacers.

Figure 8A:
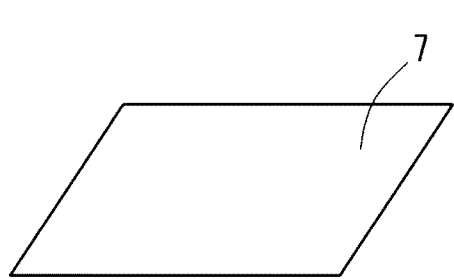
FIGS. 8A to 8F are diagrams illustrating a waterproofing step in which spacers are used.
Figure 8B:
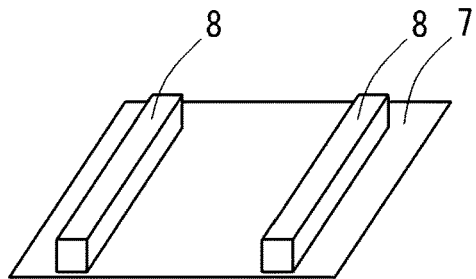

After the sheet preparation step shown in FIG. 8A, a spacer arrangement step shown in FIG. 8B is executed. In the spacer arrangement step, a pair of spacers 8 is arranged on the outer surface of the sheet member 7. The spacers 8 are members that can provide the sheet member 7 with a structure that protrudes from the outer surface of the sheet member 7, and are arranged taking up substantially the entire region in the width direction (direction orthogonal to the axial direction of the wire harness 1) of the sheet member 7. The spacers 8 are arranged with an interval therebetween in the length direction (corresponds to the axial direction of the wire harness 1) of the sheet member 7. The interval of the spacers 8 corresponds to the length of the region in which the waterproofing portion 6 is to be formed in the wire harness 1.

The spacers 8 may be constituted by any kind of material, as long as they have flexibility according to which it is possible to follow the bending of the sheet member 7 in the subsequent envelopment step, and a mode in which a string, a thread, a tape, or the like is placed on or fixed to the outer surface of the sheet member 7 can be given as an example. Alternatively, the spacers 8 may also be produced on the outer surface of the sheet member 7 using a curable material such as the resin composition 6' used in the formation of the waterproofing portion 6. Alternatively, the spacers 8 may also be constituted by the constituent material of the sheet member 7 itself by causing the surface of the sheet member 7 to protrude locally by pressing a mold member from the underside of the sheet member 7 or the like. Also, the height by which the spacers 8 protrude from the outer surface of the sheet member 7 need only be greater than or equal to the height of the liquid surface of the resin composition 6' that is to be arranged in the subsequent resin arrangement step, and need only be approximately 50 μm or more. On the other hand, from the viewpoint of ensuring flexibility of the spacers 8 and the like, the protrusion height need only be 200 μm or less.

Figure 8C:
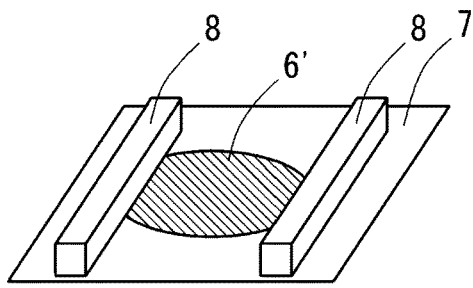

When the arrangement of the spacers 8 is complete, in a resin arrangement step shown in FIG. 8C, the resin composition 6' that is to be solidified to be the resin material constituting the waterproofing portion 6 is arranged on the surface of the sheet member 7. At this time, the resin composition 6' is arranged in the region between the pair of spacers 8.

Figure 8D:
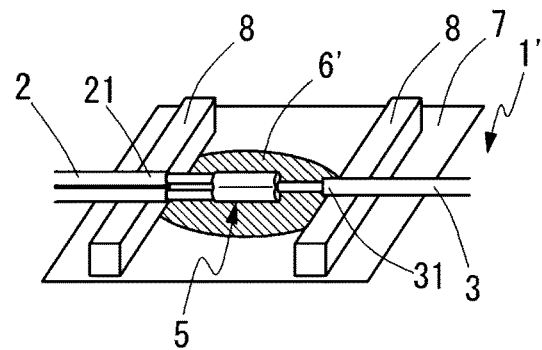

Next, in the harness arrangement step shown in FIG. 8D, the harness precursor 1' is arranged on the outer surface of the sheet member 7. At this time, the harness precursor 1' is placed on the pair of spacers 8 such that the region in which the waterproofing portion 6 is to be formed, including the splice portion 5, is arranged at a position between the pair of spacers 8. That is, the first wire bundle 2 is placed on the pair of spacers 8, the second wire bundle 3 is placed on the other spacer 8, and the splice portion 5 and the covered regions 21 and 31 on both sides thereof are arranged spanning between the pair of spacers 8.

Figure 8E:
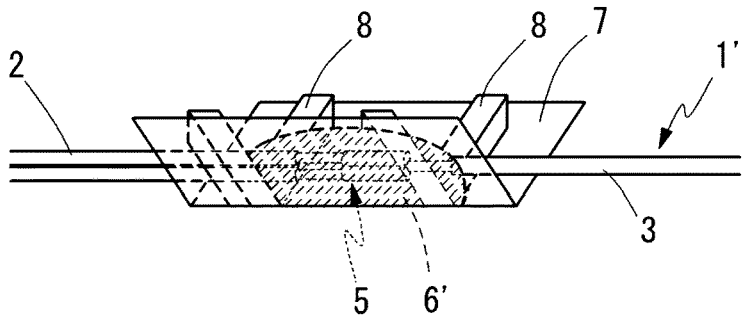
Figure 8F:
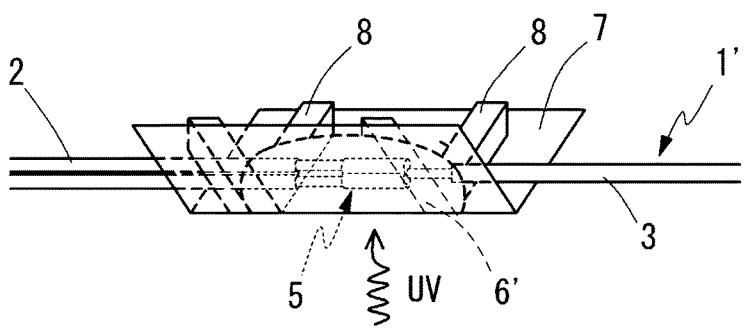

Then, the envelopment step shown in FIG. 8E and the solidification step shown in FIG. 8F are carried out. These steps need only be performed similarly to the envelopment step and the solidification step shown in FIGS. 4D and 4E regarding the case where the waterproofing portion 6 is formed without using the spacers 8. However, in the envelopment step, the spacers 8 are also bent together with the sheet member 7 to envelop the harness precursor 1'. The spacers 8 remain in the region surrounded by the sheet member 7 also in the wire harness 1 that is ultimately manufactured through the solidification step.

In this manner, the layer of the resin composition 6' can be ensured between the splice portion 5 and covered regions 21 and 31 and the sheet member 7 due to the resin composition 6' being arranged between the spaces in which the pair of spacers 8 are arranged and the harness precursor 1' being placed on the spacers 8 and the splice portion 5 and the covered regions 21 and 31 being arranged between the spacers 8. Due to the harness precursor 1' being supported from below by the spacers 8, it is not likely that the splice portion 5 and the covered regions 21 and 31 will remove the resin composition 6' and come into direct contact with the sheet member 7 due to the gravitational force acting on the harness precursor 1'. In this state, due to the envelopment step and solidification step being performed, the waterproofing portion 6 at which the entire circumferences of the splice portion 5 and the covered regions 21 and 31 are covered by the resin material can be formed with high reliability between the splice portion 5 and covered regions 21 and 31 and the sheet member 7, including the portions that are located downward in the gravity direction until the harness arrangement step.

In the wire harness 1 to be manufactured, the spacers 8 remain inside of the region enveloped by the sheet member 7, but if the spacers 8 are made of a material having a color similar to those of the sheet member 7 and the waterproofing portion 6, and has a thin shape such as a thread shape, it is difficult to see the spacers 8. Conversely, if the transparency of the sheet member 7 and the waterproofing portion 6 is high, it is advantageous in some cases that the spacers 8 have colors and shapes that stand out and are easier to see. For example, as described above, the layer of the resin composition 6' can be ensured between the splice portion 5 and covered regions 21 and 31 and the sheet member 7 by forming the waterproofing portion 6 using the spacers 8, but by making the spacers 8 easier to see, a user or the like can be made aware of the fact that the waterproofing portion 6 was formed while using the spacers 8 in that manner to ensure the layer of the resin composition 6'. In this case, in the region enveloped by the sheet member 7 in the wire harness 1 serving as a product, the spacers 8 can be used to indicate a product quality assurance that the layer of the resin material is formed over the entire circumferences of the splice portion 5 and the covered regions 21 and 31, and the waterproofing portion 6 exhibits a high waterproofing property and protective property. Also, if the transparency of the sheet member 7 and the waterproofing portion 6 is high, there are cases where it is difficult to see where the waterproofing portion 6 has been arranged in the overall wire harness 1, but by providing the spacers 8 that are easy to see, it is possible to make the user or the like of the wire harness 1 clearly aware of the presence of the waterproofing portion 6, and this can be used in a role such as attracting attention during handling.

Working Example

Hereinafter, a working example will be shown. Here, the relationship between the wires constituting the wire bundle and the waterproofing property of the waterproofing portion were studied. Note that the present disclosure is not limited to these working examples.

Production of Samples

First, wires to be included in the wire harness were prepared. The wires included insulating coverings made of polyvinyl chloride (PVC) resin with an average thickness of 0.3 mm on outer circumferences of conductors composed of stranded wires made of a copper alloy, and having conductor cross-sectional areas of 1.25 mm². The outer diameter of the wires was 2.1 mm. Three of these wires were prepared, one being used as a main wire, and two being used as branch wires. Then, the insulating coverings were removed at an intermediate portion of the main wire and end portions of the branch wires to expose the wire conductors and form exposed portions.

Figure 9:
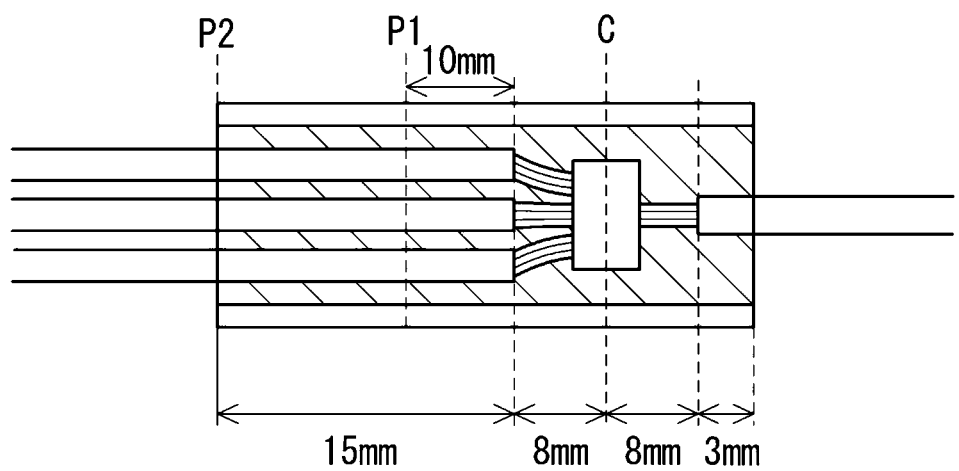
FIG. 9 is a diagram showing dimensions near the waterproofing portion of the wire harness used as a sample in a working example.

The two branch wires were bundled extending along each other on one side of the exposed portion of the main wire prepared as described above, and a first wire bundle in which the three wires were bundled and a second wire bundle composed of one wire were formed. Then, as shown in FIG. 9, the exposed portions between the first wire bundle and the second wire bundle were bonded using a crimped terminal made of a copper alloy, and thus a splice portion was formed. In this manner, a harness precursor was produced.

A waterproofing portion was formed in the region including the splice portion on the produced harness precursor. Regarding samples A1 to A6, distances were provided between the wires by attaching a jig to the first wire bundle of the harness precursor and interposing interposed portions between the wires during formation of the waterproofing portion. The type of jig used and the width of the interposed portions (width w in FIGS. 5A and 5C) were as shown in Table 1. The position at which the jig was arranged was located 60 mm away from the center C (position of the center of the crimped terminal) of the splice portion. Regarding a sample B1, the waterproofing portion was formed without using a jig.

At this time, a light-curable acrylic resin composition was used as the resin composition constituting the waterproofing portion. The acrylic resin composition was obtained by mixing 50 parts by mass of polycarbonate-based urethane acrylate oligomer and 50 parts by mass of isobornyl acrylate, and adding 0.3 parts by mass of diphenyl(2,4,6-trimethoxybenzoyl) phosphine oxide and 1.5 parts by mass of 1-hydroxycyclohexyl phenyl ketone as photoinitiators to the mixture.

As described with reference to FIGS. 4A to 4E, in the waterproofing step for forming the waterproofing portion, a resin arrangement step, a harness arrangement step, an envelopment step, and a solidification step were performed in the stated order using the sheet member (made of PVC). The solidification step was performed through exposure to ultraviolet rays from the outside of the sheet member. Note that the arrangement and solidification of the resin composition were performed in one stage, and spacers were not arranged on the outer surface of the sheet member.

As shown in Table 1, multiple samples were produced by changing the exposure time in a range of 2 to 6 seconds during the exposure to the ultraviolet rays. The wavelength of the ultraviolet rays had a median wavelength of 385 nm, and the exposure intensity was 6500 mW/cm² on the outermost surface of the sample.

FIG. 9 shows dimensions of portions near the waterproofing portion of the manufactured wire harness. That is, on the first wire bundle side, the distance from the splice portion center (position C in FIG. 9) to the edge of the covered region was 8 mm, and the distance from the edge of the covered region to the edge of the waterproofing portion was 15 mm. On the other hand, on the second wire bundle side, the distance from the slice portion center to the edge of the covered region was 8 mm, and the distance from the edge of the covered region to the edge of the waterproofing portion was 3 mm.

Evaluation Method
Measurement of Distance Between Wires

The sample wire harnesses were cut orthogonally to the axial direction at the locations at which the waterproofing portions were formed. Then, the cross sections were observed by microscope and the distances between the wires were measured. The cutting and cross-sectional observation were performed at two locations, namely a position located 10 mm away from the splice portion center toward the first wire bundle side (position P1 in FIG. 9) and an edge of the waterproofing portion on the first wire bundle side (position P2 in FIG. 9). During measurement of the inter-wire distance, two adjacent wires were used as a set, and the distance of the location at which the two wires were closest to each other was measured. Then, the measurement value with the largest distance among the measurement values of three sets was recorded as the inter-wire distance.

Evaluation of Waterproofing Property

The waterproofing property after high-temperature endurance was evaluated for samples with different ultraviolet ray exposure times during formation of the waterproofing portion. First, the samples were left for 1000 hours or 2000 hours in an environment with a temperature of 85° C. and a humidity of 85% RH. Thereafter, a waterproofing property evaluation test was performed at room temperature and in the atmosphere. The waterproofing property evaluation test was performed using an air leak test. That is, an air pressure of 200 kPa was applied for one minute to each insulated wire constituting the wire harness in a state in which the region of the wire harness including the waterproofing portion was immersed in water. At this time, if no occurrence of air bubbles from the location of the waterproofing portion was confirmed through visual observation, it was determined that the waterproofing property was maintained, and the sample was determined as acceptable. On the other hand, if the occurrence of air bubbles from the location of the waterproofing portion was confirmed, it was determined that the waterproofing property was not maintained, and the sample was determined as unacceptable.

For each sample, the waterproofing property evaluation test was performed on twenty pieces after high-temperature endurance. If even one of the twenty pieces did not pass the waterproofing property evaluation test after high-temperature endurance for 1000 hours, the waterproofing property was evaluated as (B), which is insufficient. If all of the twenty pieces passed the waterproofing property evaluation test after high-temperature endurance for 1000 hours, the waterproofing property was evaluated as (A), which is high. Furthermore, if all of the twenty pieces passed the waterproofing property evaluation test after high-temperature endurance for 2000 hours, the waterproofing property was evaluated as (A+), which is particularly excellent. Also, high-temperature endurance of only 120 hours was performed on the samples whose waterproofing properties were determined as being insufficient (B), and if there were pieces that did not pass the waterproofing property evaluation test even with high-temperature endurance for a short amount of time, the waterproofing property was evaluated as (B−), which is particularly low.

Evaluation Results

The results of measuring the inter-wire distances, the results of the waterproofing property evaluation after high-temperature endurance, and the shapes of the jigs and widths of the interposed portions used in the formation of the waterproofing portions are summarized for each sample in the following Table 1.

TABLE 1

| | | Sample A1 | Sample A2 | Sample A3 | Sample A4 | Sample A5 | Sample A6 | Sample B1 |
|---|---|---|---|---|---|---|---|---|
| Jig | Jig shape | | V-shaped | | | I-shaped | | No jig |
| | Interposed portion width [mm] | 1 | 2 | 3 | 1 | 2 | 3 | |
| Inter-wire distance | 10 mm from splice portion center [μm] | 38 | 77 | 116 | 38 | 77 | 116 | 0 |
| | Waterproofing portion edge [μm] | 462 | 923 | 1386 | 462 | 923 | 1386 | 0 |
| Waterproofing property after high-temperature endurance | 2 sec. light exposure | A | A+ | A+ | A | A+ | A+ | B− |
| | 3 sec. light exposure | A | A+ | A+ | A | A+ | A+ | B |
| | 4 sec. light exposure | A | A+ | A+ | A | A+ | A+ | B |
| | 6 sec. light exposure | A | A+ | A+ | A | A+ | A+ | B |

According to Table 1, when the waterproofing portion is formed, no distance was provided between the wires in sample B1 in which no jig was used. That is, the adjacent wires were in direct contact with each other. On the other hand, in samples A1 to A6 in which jigs were used and interposed portions were interposed between the wires, distances were provided between the wires at both the position located 10 mm away from the splice portion center and the waterproofing portion edge. In all of the samples A1 to A3 in which the Y-shaped jigs were used and the samples A4 to A6 in which the I-shaped jigs were used as well, the inter-wire distances increased the greater the widths of the interposed portions were.

Upon viewing the results of the waterproofing evaluation after high-temperature endurance, in sample B1 in which no distance is provided between the wires, the waterproofing property was insufficient when any light exposure time was used. In particular, if the light exposure time was 2 seconds, curing of the resin composition did not sufficiently progress, and the waterproofing property was particularly low. It is understood that, due to distance not being provided between the wires, the wires came into direct contact with each other and the resin material could not fill the region between the wires, and as a result, the adhesion of the waterproofing portion to the wires was lower, the stress that occurred between the waterproofing portion and the insulating coverings after high-temperature endurance could not be sufficiently mitigated, and separation of the waterproofing portion occurred.

On the other hand, in samples A1 to A6 in which distance is provided between the wires, a sufficient waterproofing property was observed for all light exposure times. It is understood that due to the distance being provided between the wires, the resin material also fills the space between the wires, and as a result, the adhesion of the waterproofing portion to the wires increases, the stress that occurred between the waterproofing portion and the insulating coverings after high-temperature endurance was mitigated by the resin material filling the space between the wires, and thus the adhesion of the waterproofing portion to the insulating coverings was maintained. Most importantly, a particularly excellent waterproofing property was obtained in samples A2, A3, A5, and A6, in which the wire interval at the position located 10 mm away from splice portion center was at least 20% of the thickness (0.3 mm) of the insulating covering. It is understood that this was due to the fact that the greater the distance between the wires and the amount of resin filling the space between the wires are, the more the effect of maintaining the adhesion of the waterproofing portion to the insulating covering increases due to stress mitigation.

In samples A1 to A3 in which the Y-shaped jig was used and in samples A4 to A6 in which the I-shaped jig was used, there was no difference in the results of evaluating the waterproofing property after high-temperature endurance. If the Y-shaped jig was used, distance was reliably provided between all three of the wires, but if the I-shaped jig was used, sufficient distance was not likely to be formed between the two wires accommodated in the large-sized accommodation portion. However, the results in Table 1 show that even if distance is not necessarily provided between all of the wires and the resin material is not arranged, sufficiently high waterproofing properties can be ensured in the production conditions and the high-temperature endurance conditions of the waterproofing portion used in at least the current test, as long as the distance is provided between at least two of the wires constituting a wire bundle, the resin material fills the space formed thereby, and the resin material is arranged covering the entire circumference of at least one wire.

Although an embodiment of the present disclosure was described in detail above, the present disclosure is not limited in any way to the above-described embodiment, and various modifications are possible without departing from the gist of the present disclosure.

Also, in the present disclosure, regarding the case where the waterproofing portion of the wire harness covers the entire circumference of at least one of the wires constituting a wire bundle and includes an inter-wire filling portion in which resin material fills a region between the wires, it is preferable to use a mode in which the wire harness further includes a sheet member that envelops the outer circumference of the waterproofing portion, and the waterproofing portion is formed covering the entire circumferences of the splice portion and the covered regions between the sheet member and the splice portion and between the sheet member and the covered regions. Also, a method using solidification performed in two stages, which was shown in Modified Example 1, and a method of using spacers, which was shown in Modified Example 2, were provided as methods according to which the wire harness of such a mode can be suitably manufactured. However, these preferable modes and manufacturing methods can be applied also in the case where the waterproofing portion does not include the inter-wire filling portion, and can provide the splice portion of the wire harness with a high waterproofing property. In these cases as well, excluding the configuration of the inter-wire filling portion, the preferable modes described in the present specification can be used as-is regarding the wire harness and the manufacturing method therefor.

Specifically, the following wire harness can be obtained.

A wire harness including:
a wire bundle; a splice portion; a waterproofing portion; and a sheet member,
in which the wire bundle includes a plurality of wires,
the wires each include a conductor and an insulating covering that covers an outer circumference of the conductor, and each include an exposed portion at which the conductor is exposed from the insulating covering,
at the splice portion, the exposed portions of the wires constituting the wire bundle are bonded to each other,
a portion of the wire bundle that is adjacent to the splice portion and at which the conductors are covered by the insulating coverings is a covered region,
the waterproofing portion integrally covers the splice portion and the covered region with a resin material,
the sheet member envelops an outer circumference of the waterproofing portion, and
the entire circumferences of the splice portion and the covered regions are covered to form the waterproofing portion between the sheet member and the splice portion and between the sheet member and the covered region.

Here, it is preferable that the waterproofing portion includes two portions, namely a first solidified portion and a second solidified portion. Alternatively, it is preferable that a pair of spacers that are flexible are arranged with an interval therebetween along the axial direction of the wire harness in the space enveloped by the sheet member.

Also, the following wire harness manufacturing method can be employed.

A wire harness manufacturing method for manufacturing the above-described wire harness, by performing, in the stated order:
a bonding step of bundling the plurality of wires to form the wire bundle, bonding the exposed portions to form the splice portion, and thereby producing a harness precursor; and
a waterproofing step of forming the waterproofing portion by integrally covering the splice portion and the covered region with the resin material,
in which in the waterproofing step, the following steps are executed in the stated order:
a first resin arrangement step of arranging a resin composition that is to be solidified to be the resin material on an outer surface of the sheet member spread out into a flat shape,
a first solidification step of forming a first solidified portion by solidifying the resin composition arranged in the first resin arrangement step,
a second resin arrangement step of arranging the resin composition on a region including the outer surface of the first solidified portion,
a harness arrangement step of arranging the harness precursor such that the splice portion and the covered region are arranged on the first solidified portion via the resin composition arranged in the second resin arrangement step,
an envelopment step of enveloping the splice portion and the covered region using the surface of the sheet member on which the resin composition is arranged, and
a second solidification step of solidifying the resin composition enveloped by the sheet member to form a second solidification portion.

Alternatively, the following wire harness manufacturing method can be employed.

A wire harness manufacturing method for manufacturing the above-described wire harness, by performing, in the stated order:
a bonding step of bundling the plurality of wires to form the wire bundle, bonding the exposed portions to form the splice portion, and thereby producing a harness precursor; and
a waterproofing step of forming the waterproofing portion by integrally covering the splice portion and the covered region with the resin material,
in which in the waterproofing step, the following steps are executed in the stated order:
a spacer arrangement step of arranging a flexible pair of spacers with an interval therebetween on an outer surface of the sheet member spread out into a flat shape,
a resin arrangement step of arranging a resin composition that is to be solidified to be the resin material in a region between the pair of spacers,
a harness arrangement step of placing the harness precursor on the pair of spacers such that the splice portion and the covered region are arranged between the pair of spacers,
an envelopment step of enveloping the splice portion using the surface of the sheet member on which the pair of spacers and the resin composition are arranged, and
a solidification step of solidifying the resin composition enveloped by the sheet member to form the waterproofing portion.

What is claimed is:

1. A wire harness comprising:
a wire bundle that includes a plurality of wires, each wire of the plurality of wires includes a conductor and an insulating covering that covers an outer circumference of the conductor, and each wire of the plurality of wires includes an exposed portion at which the conductor is exposed from the insulating covering, wherein
the wire bundle is divided into a first wire bundle including a first plurality of the plurality of wires and a second wire bundle including one or more of the plurality of wires;
a splice body; and
a waterproofing cover, wherein:
at the splice body, the respective exposed portions of the first and second wire bundles are bonded to each other,
a covered region of each of the first and second wire bundles is defined as a portion of each of the first and second wire bundles that is adjacent to the splice body and at which the respective conductors are covered by the respective insulating coverings,
the waterproofing cover integrally covers the splice body and the covered region with a resin material, and
the waterproofing cover includes an inter-wire filling that covers an entire circumference of at least one of the wires of the first wire bundle, the waterproofing cover filling a gap between the plurality of wires of the first wire bundle with the resin material, and a distance of the gap is set to be less than or equal to an outer diameter of a wire of the first wire bundle, wherein an outer circumference of the waterproofing cover is enveloped by a sheet member and the waterproofing cover extends to an axial edge of the sheet member relative to a central axis of the first and second wire bundles, inside a region surrounded by the sheet member, a pair of flexible spacers is arranged that is constituted by (i) any one of strings, threads, and tapes placed on or fixed to a surface of the sheet member while being spaced apart from each other along an axial direction of the wire harness, or (ii) by a raised surface of the sheet member, and the splice body and the covered region are arranged between the pair of spacers.

2. The wire harness according to claim 1, wherein in the inter-wire filling, the resin material covers the entire circumference of each of the plurality of wires forming the first wire bundle.

3. The wire harness according to claim 1, wherein:
at the axial edge, the distance of the gap is 3% or more of the thickness of the respective insulating covering of the wire of the first wire bundle.

4. The wire harness according to claim 3, wherein:
at the axial edge, a plurality of gaps, including the gap, are included between adjacent pairs all of the first plurality of wires, and a distance of each of the plurality of gaps is at least 3% of the respective thickness of the respective insulating covering of each wire of the first plurality of wires.

5. The wire harness according to claim 1, wherein:
the first wire bundle and the second wire bundle extend in different directions on both sides of the splice body.

6. A wire harness manufacturing method for manufacturing the wire harness according to claim 1 by executing, in the stated order:
a bonding step of bundling the plurality of wires to form the wire bundle, bonding the exposed portions to form the splice body, and thereby producing a harness precursor;
an isolation step of providing distance between the plurality of wires forming the first wire bundle in the harness precursor; and
a waterproofing step of forming the waterproofing cover by integrally covering the splice body and the covered region with the resin material.

7. The wire harness manufacturing method according to claim 6, wherein
in the isolation step, distance is provided between the plurality of wires forming the first wire bundle by arranging a jig that is to be interposed between the plurality of wires forming the first wire bundle, at a position located away from the splice body with respect to the position at which the waterproofing cover is to be formed.

8. The wire harness manufacturing method according to claim 6, for manufacturing the wire harness, which includes a first solidified portion and a second solidified portion as the waterproofing cover, wherein
in the waterproofing step, the following steps are executed in the stated order:
a first resin arrangement step of arranging a resin composition that is to be solidified to be the resin material, on an outer surface of the sheet member spread out into a flat shape,
a first solidification step of forming the first solidified portion by solidifying the resin composition arranged in the first resin arrangement step,
a second resin arrangement step of arranging the resin composition on a region including an outer surface of the first solidified portion,
a harness arrangement step of arranging the harness precursor such that the splice body and the covered region are arranged on the first solidified portion via the resin composition arranged in the second resin arrangement step,
an envelopment step of enveloping the splice body and the covered region using the surface of the sheet member on which the resin composition is arranged, and
a second solidification step of solidifying the resin composition enveloped by the sheet member to form the second solidification portion.

9. The wire harness manufacturing method according to claim 6 for manufacturing the wire harness, wherein
in the waterproofing step, the following steps are executed in the stated order:
a spacer arrangement step of arranging the pair of spacers with an interval therebetween on an outer surface of the sheet member spread out into a flat shape,
a resin arrangement step of arranging a resin composition that is to be solidified to be the resin material in a region between the pair of spacers,
a harness arrangement step of placing the harness precursor on the pair of spacers such that the splice body and the covered region are arranged between the pair of spacers,
an envelopment step of enveloping the splice body using the surface of the sheet member on which the pair of spacers and the resin composition are arranged, and
a solidification step of solidifying the resin composition enveloped by the sheet member to form the waterproofing cover.

10. The wire harness according to claim 1, wherein three or more wires of the first wire bundle are arranged in an annular shape, a distance of the gap between adjacent wires of the three or more wires of the first wire bundle being less than or equal to an outer diameter of each of the three or more wires of the first wire bundle.

* * * * *